(12) United States Patent
Tojima et al.

(10) Patent No.: US 9,692,267 B2
(45) Date of Patent: Jun. 27, 2017

(54) DOUBLE STATOR SWITCHED RELUCTANCE ROTATING MACHINE

(71) Applicant: IHI Corporation, Tokyo (JP)

(72) Inventors: Narifumi Tojima, Tokyo (JP);
Takehiro Jikumaru, Tokyo (JP);
Norihisa Handa, Tokyo (JP); Koshi Ishimoto, Tokyo (JP); Gen Kuwata, Tokyo (JP); Satoru Ohashi, Tokyo (JP); Toshiyuki Hirao, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 14/743,843

(22) Filed: Jun. 18, 2015

(65) Prior Publication Data

US 2015/0288235 A1    Oct. 8, 2015

Related U.S. Application Data

(63) Continuation of application No. PCT/JP2013/084867, filed on Dec. 26, 2013.

(30) Foreign Application Priority Data

Dec. 28, 2012  (JP) ................................. 2012-288108

(51) Int. Cl.
*H02K 1/28*    (2006.01)
*H02K 16/04*   (2006.01)
(Continued)

(52) U.S. Cl.
CPC .............. *H02K 1/28* (2013.01); *H02K 1/246* (2013.01); *H02K 16/04* (2013.01); *H02K 19/103* (2013.01)

(58) Field of Classification Search
CPC ............................ H02K 16/00; H02K 16/04
(Continued)

(56) References Cited

U.S. PATENT DOCUMENTS 2,985,779 A * 5/1961 Flaningam ............. H02K 1/278
                                                    310/156.18
4,501,980 A * 2/1985 Welburn ................ H02K 37/02
                                                    310/12.04
(Continued)

FOREIGN PATENT DOCUMENTS

CN        202488301 U    10/2012
DE        38 21 660 C1    8/1989
(Continued)

OTHER PUBLICATIONS

International Search Report mailed Mar. 25, 2014 in PCT/JP2013/084867 (with English translation) (4 pages).
(Continued)

*Primary Examiner* — Naishadh Desai
(74) *Attorney, Agent, or Firm* — Rothwell, Figg, Ernst & Manbeck, P.C.

(57) ABSTRACT

A double stator switched reluctance rotating machine includes an annular rotor, an outer stator that is disposed outside the rotor, and an inner stator that is disposed inside the rotor; and employs a structure in which the rotor is provided with a bolt fastening hole passing through the rotor in an axial direction and the bolt fastening hole is provided at a position depending on magnetic characteristics of the outer and inner stators.

19 Claims, 25 Drawing Sheets

(51) Int. Cl.
*H02K 19/10* (2006.01)
*H02K 1/24* (2006.01)

(58) Field of Classification Search
USPC .................. 310/46, 112–114, 414, 216.061,
310/216.083–216.085, 216.127, 216.128,
310/156.18
See application file for complete search history.

(56) References Cited

U.S. PATENT DOCUMENTS

| | | | | |
|---|---|---|---|---|
| 5,039,897 | A * | 8/1991 | Iwamatsu | H02K 1/2773 310/156.18 |
| 5,744,895 | A * | 4/1998 | Seguchi | B60K 6/26 310/112 |
| 5,783,893 | A * | 7/1998 | Dade | H02K 16/00 310/114 |
| 5,838,085 | A * | 11/1998 | Roesel, Jr. | F02N 11/04 310/112 |
| 6,603,232 | B2 * | 8/2003 | Van Dine | H02K 1/2773 310/152 |
| 8,860,281 | B2 * | 10/2014 | Maekawa | H02K 19/24 310/112 |
| 8,928,198 | B2 * | 1/2015 | Lutz | H02K 1/2753 310/156.18 |
| 2003/0015931 | A1 * | 1/2003 | Nishimura | H02K 16/04 310/184 |
| 2004/0130229 | A1 * | 7/2004 | Akatsu | H02K 1/148 310/112 |
| 2005/0077802 | A1 * | 4/2005 | Toujima | H02K 16/02 310/266 |
| 2005/0151437 | A1 | 7/2005 | Ramu | |
| 2007/0252486 | A1 | 11/2007 | Kobayashi | |
| 2008/0142284 | A1 * | 6/2008 | Qu | B60K 17/145 180/65.6 |
| 2008/0174194 | A1 * | 7/2008 | Qu | H02K 7/1823 310/114 |
| 2008/0246429 | A1 | 10/2008 | Atarashi et al. | |
| 2009/0021089 | A1 | 1/2009 | Nashiki | |
| 2013/0187505 | A1 * | 7/2013 | Senoo | H02K 1/2773 310/156.08 |
| 2015/0288264 | A1 | 10/2015 | Tojima et al. | |

FOREIGN PATENT DOCUMENTS

| | | |
|---|---|---|
| JP | 9-8183 Y1 | 6/1934 |
| JP | 2-228234 A | 9/1990 |
| JP | 6-121518 A | 4/1994 |
| JP | 2004-201488 A | 7/2004 |
| JP | 2008-131663 A | 6/2008 |
| JP | 2008-161000 A | 7/2008 |
| JP | 2008-259302 A | 10/2008 |
| JP | 2008-301610 A | 12/2008 |
| JP | 2010-98853 A | 4/2010 |
| JP | 2011-244643 A | 12/2011 |
| JP | 2012-44864 A | 3/2012 |
| WO | 2012/045121 A1 | 4/2012 |

OTHER PUBLICATIONS

International Search Report mailed Mar. 25, 2014 in PCT/JP2013/084449 (with an English translation) (4 pages).
U.S. Office Action mailed Aug. 30, 2016 in co-pending U.S. Appl. No. 14/746,578, filed Jun. 22, 2015. (10 pages).

* cited by examiner

FIG. 26

| | | PATTERN 1 | PATTERN 2 | PATTERN 3 | PATTERN 4 | PATTERN 5 | PATTERN 6 | PATTERN 7 | PATTERN 8 |
|---|---|---|---|---|---|---|---|---|---|
| TORSION | RATIO | 1.00 | 0.47 | 0.95 | 0.40 | 0.39 | 9.16 | 0.49 | 0.47 |
| BENDING | RATIO | 1.00 | 0.63 | 0.79 | 0.52 | 0.47 | 1.39 | 0.60 | 0.51 |
| EVALUATION | STIFFNESS (TORSION, BENDING) | △ | △〜○ | △ | ○ | ◎ | × | △〜○ | ○ |
| | ELECTROMAGNETIC CHARACTERISTICS | ○ | ×〜△ | △ | △ | △ | △ | △ | △ |
| | MANUFACTURABILITY / WORKABILITY | ◎ | ○ | △ | △ | × | ○ | ○ | × |
| | MANUFACTURABILITY / ASSEMBLABILITY | ○ | × | △ | △ | △ | ×〜△ | ×〜△ | △〜× |
| | OVERALL EVALUATION | △ | △ | ○ | ◎ | △ | × | ○ | × |

DOUBLE STATOR SWITCHED RELUCTANCE ROTATING MACHINE

This application is a Continuation of International Application No. PCT/JP2013/084867, filed on Dec. 26, 2013, claiming priority based on Japanese Patent Application No. 2012-288108, filed Dec. 28, 2012, the content of which is incorporated herein by reference in their entirety.

TECHNICAL FIELD

The present invention relates to a double stator switched reluctance rotating machine.

BACKGROUND ART

A switched reluctance rotating machine does not include a permanent magnet or a winding wire in a rotor, and is adapted to be operated by magnetic attraction generated between the rotor and a stator. The switched reluctance rotating machine has problems of vibration, noises, and the like in principle. However, the switched reluctance rotating machine has a simple and solid structure, can also withstand high-speed rotation, and is inexpensive since the switched reluctance rotating machine does not require expensive permanent magnets such as neodymium magnets. Accordingly, in recent years, research and development for the switched reluctance rotating machine as a rotating machine, which is inexpensive and excellent in reliability, has progressed for practical use.

As a part of the progress to the practical use, a method of making the switched reluctance rotating machine have a double-stator structure is proposed in order to improve the performance of the switched reluctance rotating machine.

Patent Document 1 discloses a double-stator motor that includes a ring-shaped rotor rotating between an outer stator and an inner stator.

The rotor includes a rotor core in which a plurality of ring-shaped electrical steel sheets are laminated, a rotor base that connects the rotor core to a shaft and supports the rotor core on the shaft, and pinching members that pinch and restrain the plurality of electrical steel sheets and connect the electrical steel sheets to the rotor base. According to this structure, since bolt fastening holes do not need to be formed in the plurality of laminated electrical steel sheets, the thickness of the rotor can therefore be reduced by the lack of the bolt fastening holes.

CITATION LIST

Patent Document

[Patent Document 1] Japanese Unexamined Patent Application, First Publication No. 2010-98853

SUMMARY OF INVENTION

Technical Problem

Incidentally, when a structure employing double stators is applied to a large rotating machine (a large motor or a large generator) having a large diameter in which the ratio of an inner stator disposed inside can be increased, an effect of improving performance (increasing torque or the like) tends to be enhanced.

Here, when the related art is applied to the large rotating machine, due to tolerance, rattling is likely to occur at portions where the pinching members pinch the electrical steel sheets or at portions where the pinching members are connected to the rotor base. For this reason, since torque transmission performance deteriorates, component machining accuracy of the pinching members or the like is required. Accordingly, there is a possibility in that costs are increased.

Meanwhile, a method of forming bolt fastening holes at the plurality of laminated electrical steel sheets to directly fasten and fix the electrical steel sheets is also considered. However, since the rotor of the switched reluctance rotating machine is a portion contributing to the generation of torque, in terms of the improvement of performance, it is not preferable that bolt fastening holes are formed in the rotor and the area of the rotor is reduced.

The invention has been made in consideration of the above-mentioned circumstances, and an object of the invention is to provide a double stator switched reluctance rotating machine of which performance can be improved at a low cost.

Solution to Problem

As a result of repetition of experiments to solve the above-mentioned circumstances, the present inventors found out that the deterioration of the performance of the double stator switched reluctance rotating machine can be prevented when the position of the bolt fastening hole of the rotor is set to an appropriate position depending on magnetic characteristics of outer and inner stators. Accordingly, the present inventors made the invention.

That is, in order to solve the above-mentioned circumstances, according to a first aspect of the invention, there is provided a double stator switched reluctance rotating machine including an annular rotor, an outer stator that is disposed outside the rotor, and an inner stator that is disposed inside the rotor. The rotor is provided with a bolt fastening hole that passes through the rotor in an axial direction, and the bolt fastening hole is provided at a position depending on magnetic characteristics of the outer and inner stators.

When this structure is employed, the bolt fastening hole is provided at an appropriate position depending on the magnetic characteristics of the outer and inner stators in the first aspect. Accordingly, it is possible to prevent magnetic influence on the rotor and to eliminate rattling by inserting a bolt into the bolt fastening hole in the axial direction to directly fasten the rotor. Therefore, it is possible to improve mechanical torque transmission performance.

Further, according to a second aspect of the invention, in the first aspect, the rotor includes an annular yoke portion, a first salient pole that protrudes outward from the yoke portion, and a second salient pole that protrudes inward from the yoke portion and has the same phase as the first salient pole, and the bolt fastening hole is provided at the yoke portion.

When this structure is employed, in the second aspect, the first salient pole facing the outer stator and the second salient pole facing the inner stator are portions on which magnetic flux is concentrated. Accordingly, when the bolt fastening hole is provided at the yoke portion that relatively hardly blocks magnetic paths, it is possible to prevent performance from being affected.

Furthermore, according to a third aspect of the invention, in the second aspect, the bolt fastening hole is provided in a region that connects the first salient pole with the second salient pole in a radial direction.

When this structure is employed, in the third aspect, the region of the yoke portion connects the first and second salient poles, which have the same phase, in the radial direction, and magnetic flux flows into the region from opposite directions, that is, from both the first salient pole and the second salient pole. Accordingly, a magnetic neutral point may be formed between the first and second salient poles. Therefore, when the bolt fastening hole is formed in the region, it is possible to more reliably prevent performance from being affected.

Moreover, according to a fourth aspect of the invention, in the second or third aspect, the bolt fastening hole is provided on a center line that connects a center of the first salient pole with a center of the second salient pole in the radial direction.

When this structure is employed, in the fourth aspect, magnetic flux having flowed into the yoke portion from both the first and second salient poles flows along the yoke portion to both sides of the yoke portion in the circumferential direction in the same way. Accordingly, a magnetic neutral point can be formed on the center line connecting the center of the first salient pole with the center of the second salient pole in the radial direction. Therefore, when the bolt fastening hole is formed on the center line, it is possible to more reliably prevent performance from being affected.

Further, according to a fifth aspect of the invention, in the any one of the second to fourth aspects, the magnetomotive force of the inner stator is set to be smaller than the magnetomotive force of the outer stator, and the bolt fastening hole is provided close to the inner stator.

When this structure is employed, in the fifth aspect, a magnetic neutral point can be formed close to the inner stator in a case in which the magnetomotive force of the inner stator is set to be smaller than the magnetomotive force of the outer stator. Accordingly, when the bolt fastening hole is formed close to the inner stator, it is possible to more reliably prevent performance from being affected.

Furthermore, according to a sixth aspect of the invention, in the fifth aspect, the bolt fastening hole is formed at a position depending on the ratio of the magnetomotive force of the outer stator to the magnetomotive force of the inner stator in the radial direction.

When this structure is employed, in the sixth aspect, the position of the magnetic neutral point in the radial direction depends on the ratio of the magnetomotive force of the outer stator to the magnetomotive force of the inner stator. Accordingly, it is possible to more reliably prevent performance from being affected when the bolt fastening hole is formed at an appropriate position depending on the ratio of the magnetomotive force of the outer stator to the magnetomotive force of the inner stator.

Moreover, according to a seventh aspect of the invention, in the fourth aspect, a plurality of the bolt fastening holes are provided on the center line.

When this structure is employed, in the seventh aspect, the center line is magnetically neutral and is hardly affected magnetically. Accordingly, it is possible to improve mechanical torque transmission performance by increasing the number of the bolt fastening holes provided on the center line.

Further, according to an eighth aspect of the invention, in the first aspect, the rotor is formed by a combination of a plurality of core pieces in a circumferential direction.

When this structure is employed, in the eighth aspect, the rotor has a split structure and is formed by the combination of the plurality of core pieces in the circumferential direction. Accordingly, it is possible to easily manufacture the rotor that has a large diameter and corresponds to a large rotating machine rotating with low speed and large torque.

Furthermore, according to a ninth aspect of the invention, in the eighth aspect, the rotor includes core pressing members that are provided on at least one of the outside and inside thereof in the radial direction and press joints at which the plurality of core pieces are combined.

When this structure is employed, in the ninth aspect, the joints of the rotor having the split structure are pressed by the core pressing members. Accordingly, it is possible to sufficiently ensure the strength of the entire rotor.

Moreover, according to a tenth aspect of the invention, in the first aspect, the bolt fastening hole has a shape depending on the magnetic characteristics of outer and inner stators.

When this structure is employed, in the tenth aspect, the bolt fastening hole is formed in an appropriate shape depending on the magnetic characteristics of the outer and inner stators. Accordingly, it is possible to prevent a magnetic influence and to change the shape of the bolt, which is to be inserted into the bolt fastening hole, into a different shape in a range that is not affected magnetically. Therefore, it is possible to increase the stiffness of the rotor against torsion and bending.

Advantageous Effects of Invention

According to the invention, a double stator switched reluctance rotating machine of which performance can be improved at a low cost is obtained.

BRIEF DESCRIPTION OF DRAWINGS

FIG. 26 is a view showing the stiffness, the electromagnetic characteristics, and the manufacturability of the rotor and the comparison of comprehensive evaluation thereof depending on differences in the shapes of the bolt fastening holes of the example of the third embodiment of the invention.

DESCRIPTION OF EMBODIMENTS

An example of an embodiment of the invention will be described below with reference to the drawings.

First Embodiment

Figure 1:
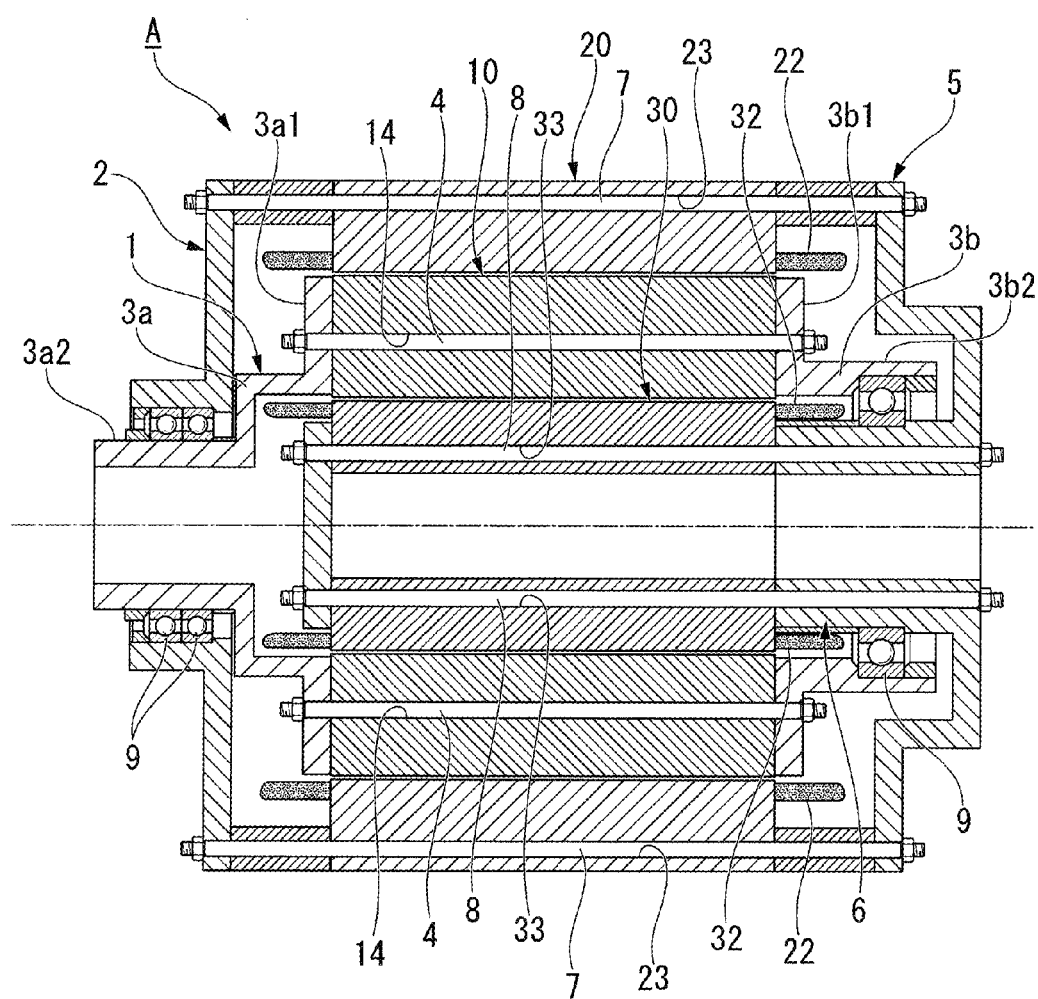
FIG. 1 is a cross-sectional view of a double stator switched reluctance motor according to a first embodiment of the invention.
Figure 2:
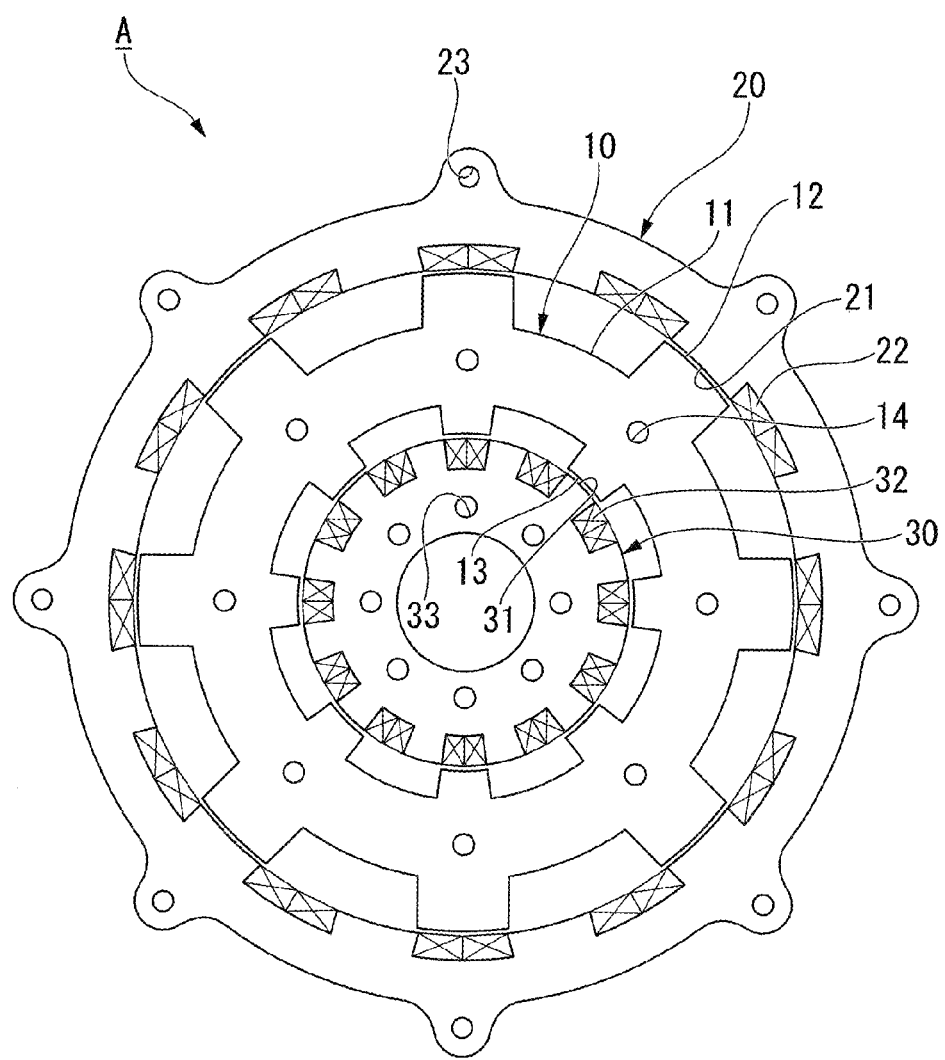
FIG. 2 is a cross-sectional view of FIG. 1.
Figure 3:
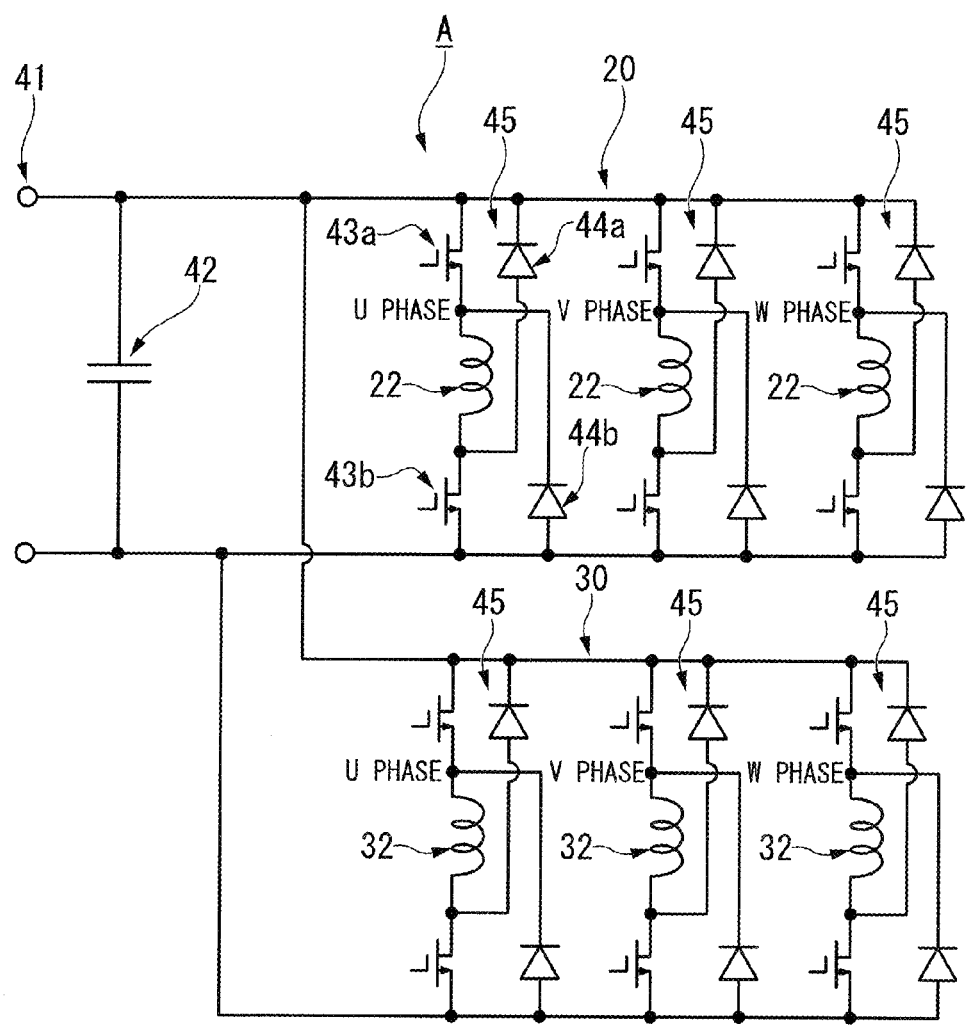
FIG. 3 is a circuit diagram of the double stator switched reluctance motor according to the first embodiment of the invention.
Figure 4:
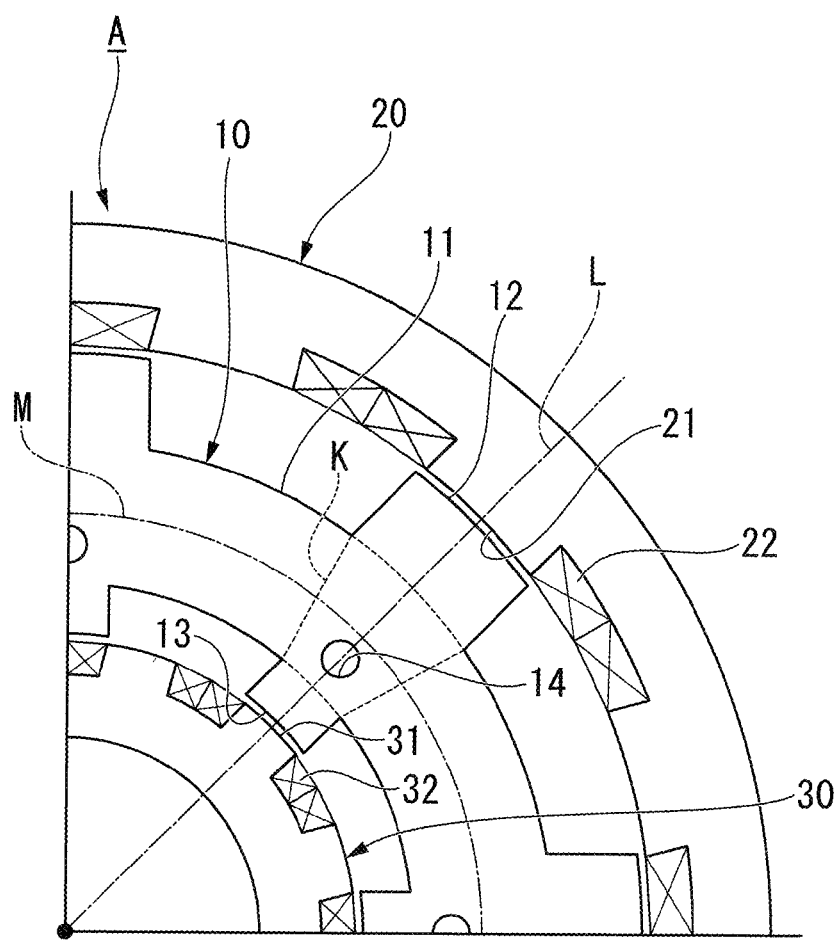
FIG. 4 is an enlarged view showing the arrangement of bolt fastening holes that are formed in a rotor of the first embodiment of the invention.
Figure 5:
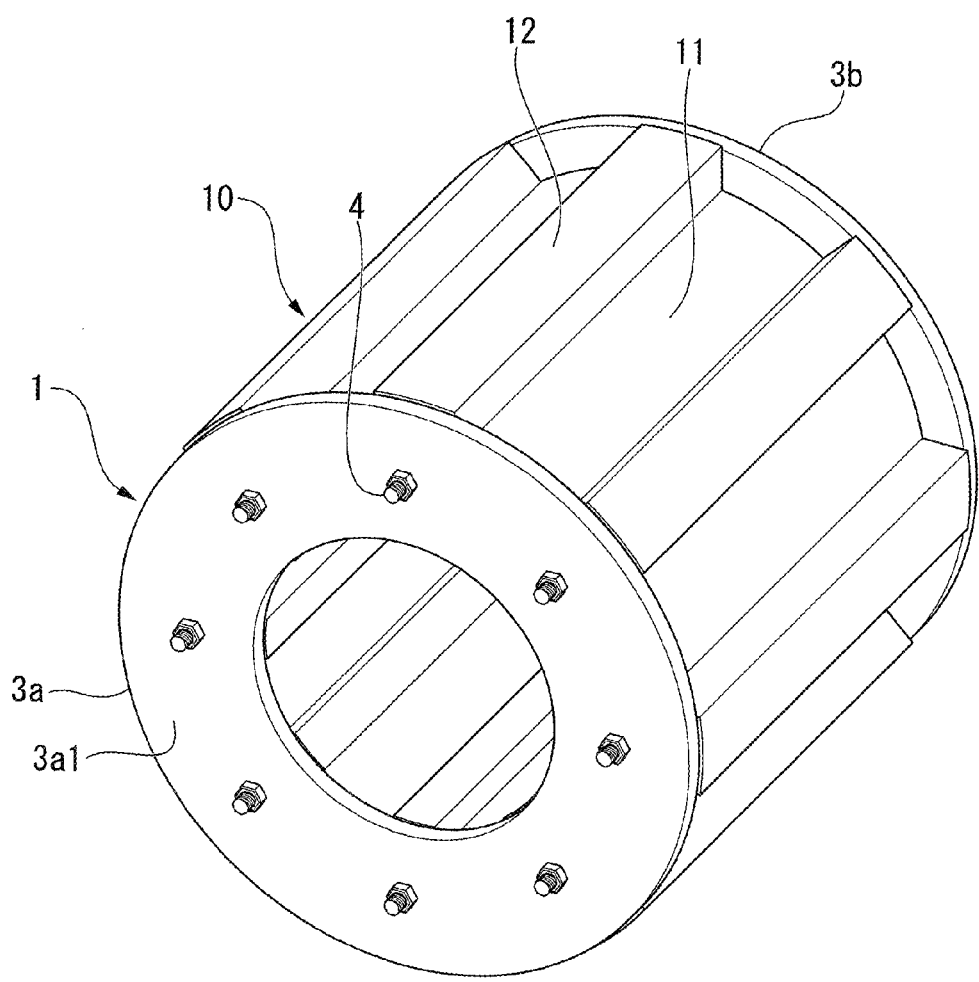
FIG. 5 is a perspective view of the rotor of the first embodiment of the invention.

FIG. 1 is a cross-sectional view of a double stator switched reluctance motor A according to a first embodiment of the invention. FIG. 2 is a cross-sectional view of FIG. 1. FIG. 3 is a circuit diagram of the double stator switched reluctance motor A according to the first embodiment of the invention. FIG. 4 is an enlarged view showing the arrangement of bolt fastening holes 14 that are formed in a rotor 10 of the first embodiment of the invention. FIG. 5 is a perspective view of the rotor 10 of the first embodiment of the invention.

As shown in FIG. 2, the double stator switched reluctance motor A (hereinafter, simply referred to as a switched reluctance motor A in some cases) includes an annular rotor 10, an outer stator 20 that is disposed outside the rotor 10, and an inner stator 30 that is disposed inside the rotor 10. The switched reluctance motor A according to this embodiment is a three-phase motor having a U-phase, a V-phase, and a W-phase, and has a three-phase 12/8-pole structure in which the number of poles of the stator is 12 and the number of poles of the rotor is 8.

As shown in FIG. 1, the switched reluctance motor A includes a rotor base 1 and a stator base 2. The rotor base 1 is connected to the rotor 10 and can be rotated integrally with the rotor 10. The rotor base 1 includes a base member 3a that is connected to one side (the left side in FIG. 1) of the rotor 10 in an axial direction and a base member 3b that is connected to the other side (the right side in FIG. 1) of the rotor 10 in the axial direction. The base members 3a and 3b are fastened and fixed to the rotor 10 by a plurality of bolts 4.

The bolts 4 are inserted into the bolt fastening holes 14 that are formed in the rotor 10 so as to pass through the rotor 10 in the axial direction (the horizontal direction in FIG. 1), and fasten the rotor 10 together with the base members 3a and 3b from both sides in the axial direction. The base member 3a includes a flange portion 3a1 to which the rotor 10 is connected and a cylindrical shaft portion 3a2 that protrudes from the stator base 2 and is connected to an output shaft (not shown). Meanwhile, the base member 3b includes a flange portion 3b1 to which the rotor 10 is connected and a cylindrical shaft portion 3b2 that is rotatably supported in the stator base 2.

The stator base 2 includes an outer housing 5 that supports the outer stator 20 and an inner housing 6 that supports the inner stator 30. The rotor base 1 is disposed between the outer housing 5 and the inner housing 6 in the shape of a bush. The outer stator 20 is fastened and fixed to the outer housing 5 by a plurality of bolts 7. The bolts 7 are inserted into bolt fastening holes 23 that are formed in the outer stator 20 so as to pass through the outer stator 20 in the axial direction, and fasten the outer stator 20 together with the outer housing 5 from both sides in the axial direction.

The inner stator 30 is fastened and fixed to the inner housing 6 by a plurality of bolts 8. The bolts 8 are inserted into bolt fastening holes 33 that are formed in the inner stator 30 so as to pass through the inner stator 30 in the axial direction, and fasten the inner stator 30 together with the inner housing 6 from both sides in the axial direction. Further, the stator base 2 receives a plurality of bearings 9 that support the rotor base 1 so as to allow the rotor base 1 to be rotatable. The bearings 9 are provided on both sides of the rotor 10 so that one bearing 9 is provided between the outer periphery of the inner housing 6 and the inner periphery of the shaft portion 3b2 and two bearings 9 are provided between the inner periphery of the outer housing 5 and the outer periphery of the shaft portion 3a2.

The rotor 10 is formed so that a plurality of electrical steel sheets are fastened and fixed while being laminated in the axial direction. As shown in FIG. 2, the rotor 10 includes an annular yoke portion 11, first salient poles 12 that protrude outward from the yoke portion 11, and second salient poles 13 that protrude inward from the yoke portion 11 and have the same phase as the first salient poles 12. The yoke portion 11 is formed in a cylindrical shape, and has a thickness that is magnetically sufficient. Eight first salient poles 12 are provided on the outer periphery of the yoke portion 11 at an interval of 45°. Further, eight second salient poles 13 are provided on the inner periphery of the yoke portion 11 at an interval of 45° so as to have the same phase as the first salient poles 12.

The outer stator 20 is formed of an annular magnetic body, and includes twelve salient poles 21 that are provided on the inner periphery of the outer stator at an interval of 30° and coils 22 that are wound on the salient poles 21, respectively. The coils 22 are arranged so that phases are separated in the order of a U-phase, a V-phase, a W-phase, a U-phase, and the like in a circumferential direction.

The inner stator 30 is formed of an annular magnetic body, and includes twelve salient poles 31 that are provided on the outer periphery of the inner stator at an interval of 30° so as to have the same phase as the salient poles 21 and coils 32 that are wound on the salient poles 31, respectively. Just like the coils 22, the coils 32 are arranged so that phases are separated in the order of a U-phase, a V-phase, a W-phase, a U-phase, and the like in the circumferential direction.

The switched reluctance motor A having the above-mentioned structure includes inverter circuits shown in FIG. 3. Meanwhile, in FIG. 3, reference numeral 41 denotes a DC power source and reference numeral 42 denotes a smoothing capacitor. Further, the outer stator 20 is provided with four coils 22 per phase, but only one coil 22 per phase will be shown on behalf of the coils 22 for the improvement of visual recognition and the rest of the coils 22 will not be shown. Furthermore, the inner stator 30 is provided with four coils 32 per phase, but only one coil 32 per phase will be shown on behalf of the coils 32 for the improvement of visual recognition and the rest of the coils 32 will not be shown.

In this embodiment, as shown in FIG. 3, the inverter circuit of the outer stator 20 and the inverter circuit of the inner stator 30 are connected to each other in parallel. Each of the inverter circuits includes an asymmetric half bridge circuit 45 that includes two switching elements 43a and 43b and two diodes 44a and 44b. The asymmetric half bridge circuits 45 are connected to the coils 22 of the outer stator 20 and the coils 32 of the inner stator 30, respectively. The coils 22 and 32 can be individually driven (conducted) by the respective asymmetric half bridge circuits 45.

Further, in this embodiment, the outer and inner stators 20 and 30 are connected to each other in parallel, the outer and inner stators 20 and 30 have different magnetomotive forces, and the magnetomotive force of the inner stator 30 is set to be smaller than the magnetomotive force of the outer stator 20. A magnetomotive force is obtained by the product of the number of winding of a coil and current that flows in the coil. It is difficult to structurally ensure enough winding space in the inner stator 30 in the double stator structure as shown in FIG. 2.

A method of reducing the cross-sectional area of a winding wire to increase the number of winding of the wire or a method of increasing the length (depth) of the salient pole 31 of the inner stator 30 to ensure a winding space are considered to make the magnetomotive force constant in the switched reluctance motor A. However, since current density is increased in the former method, there are possibilities in that the efficiency of a motor decreases and the temperature of the winding wire rises due to an increase in copper loss. Further, since the diameter of the shaft supporting the weight of the entire motor is traded off in the latter method, there is a possibility in that mechanical strength cannot be sufficiently ensured for an increase in weight when the diameter of the shaft is reduced.

Accordingly, since the magnetomotive force of the inner stator 30 is set to be smaller than the magnetomotive force of the outer stator 20 in this embodiment, a decrease in the efficiency of the motor and the rise of the temperature of the winding wire are prevented and mechanical strength is sufficiently ensured. Meanwhile, since magnetic flux flowing out of one of the outer and inner stators 20 and 30 flows backward to the other thereof when the magnetomotive forces of the outer and inner stators 20 and 30 are different from each other, there is a concern that the performance of the motor may deteriorate. However, it is confirmed from an electromagnetic analysis test that an adverse effect is not generated when the thickness of the yoke portion 11 of the rotor 10 is sufficiently ensured as in this embodiment.

Furthermore, when the outer and inner stators 20 and 30 are connected to each other in parallel as in this embodiment, an effect of improving the performance of the motor is enhanced in comparison with a case in which the outer and inner stators 20 and 30 are connected to each other in series. That is, the reason for this is that the magnetomotive force of the outer stator 20 to be mainly driven is significantly reduced due to the reduction of current since inductance is increased in a series connection. Meanwhile, in the case of a parallel connection, since the magnetomotive force of the outer stator 20 can be ensured and an output of the inner stator 30 can be used, the output is a simple sum of the outputs of the outer and inner stators 20 and 30. Accordingly, the performance of the motor is easily improved.

As shown in FIG. 4, the bolt fastening holes 14 are formed at positions depending on the magnetic characteristics of the above-mentioned outer and inner stators 20 and 30. The positions of the bolt fastening holes 14 of the rotor 10 are set to appropriate positions depending on the magnetic characteristics of the outer and inner stators 20 and 30 in this embodiment, so that the rotor 10 contributing to the generation of torque is not magnetically affected and the deterioration of the performance of the motor is prevented.

Specifically, the bolt fastening holes 14 are formed at the yoke portion 11 of the rotor 10 as shown in FIG. 4. The first salient poles 12 facing the outer stator 20 and the second salient poles 13 facing the inner stator 30 are portions on which magnetic flux is concentrated. Accordingly, when the bolt fastening holes 14 are formed at the yoke portion 11 that does not block the magnetic paths of the first and second salient poles 12 and 13, it is possible to prevent the performance of the motor from being affected.

Further, each of the bolt fastening holes 14 of this embodiment is formed in a region K, which connects the first salient pole 12 with the second salient pole 13 in a radial direction, of the yoke portion 11. The region K of the yoke portion 11 connects the first and second salient poles 12 and 13, which have the same phase, in the radial direction and magnetic flux flows into the region K from opposite directions, that is, from both the first salient pole 12 and the second salient pole 13, a magnetic neutral point (which is denoted by reference numeral P in FIGS. 6A, 6B, 7A, 7B, and the like of an example to be described below) may be formed between the first and second salient poles 12 and 13. Accordingly, when the bolt fastening hole 14 is formed in the region K, it is possible to more reliably prevent the performance of the motor from being affected.

Furthermore, each of the bolt fastening holes 14 of this embodiment is provided on a center line L that connects the center of the first salient pole 12 with the center of the second salient pole 13 in the radial direction on the yoke portion 11. The center line L corresponds to the axes of symmetry (perpendicular bisectors) of the first and second salient poles 12 and 13. Since magnetic flux, which has flowed into the yoke portion 11 from both the first and second salient poles 12 and 13, flows along both sides of the yoke portion 11 in the circumferential direction in the same way, a magnetic neutral point may be provided on the center line L that connects the center of the first salient pole 12 with the center of the second salient pole 13 in the radial direction. Accordingly, when the bolt fastening hole 14 is provided on the center line L, it is possible to more reliably prevent the performance of the motor from being affected.

Moreover, each of the bolt fastening holes 14 of this embodiment is formed at the yoke portion 11 so as to be close to the inner stator 30. Reference numeral M shown in FIG. 4 denotes a radial center line (thickness center) of the yoke portion 11. When the magnetomotive force of the inner stator 30 is set to be smaller than the magnetomotive force of the outer stator 20 as in this embodiment, a magnetic neutral point is formed close to the inner stator 30 due to a difference in the magnitude of the magnetomotive force. Accordingly, when the bolt fastening hole 14 is formed close to the inner stator 30, it is possible to more reliably prevent the performance of the motor from being affected.

Further, in this embodiment, the bolt fastening hole 14 is formed at a position depending on a ratio of the magnetomotive force (large) of the outer stator 20 to the magnetomotive force (small) of the inner stator 30 in the radial direction. Since the position of the above-mentioned magnetic neutral point in the radial direction depends on the ratio of the magnetomotive force of the outer stator 20 to the magnetomotive force of the inner stator 30, it is possible to more reliably prevent the performance of the motor from being affected when the bolt fastening hole 14 is formed at an appropriate position depending on the ratio of the magnetomotive force of the outer stator to the magnetomotive force of the inner stator.

Meanwhile, as a result of the electromagnetic analysis test, it is considered that the position of the magnetic neutral point in the radial direction does not exactly correspond to the ratio of the magnetomotive force of the outer stator 20 to the magnetomotive force of the inner stator 30 and is also affected by other parameters. However, since the influence of the parameter of the ratio of the magnetomotive force of the outer stator 20 to the magnetomotive force of the inner stator 30 is greater than the influence of other parameters in the radial direction, it is possible to make the bolt fastening hole 14 substantially correspond to the magnetic neutral point when the ratio of the magnetomotive force of the outer stator 20 to the magnetomotive force of the inner stator 30 is set as a reference.

When the bolt fastening holes 14 are set to appropriate positions as described above, the deterioration of the performance of the motor is not caused and it is possible to eliminate rattling by directly fastening the rotor 10 to the rotor base 1 as shown in FIG. 5 (the shaft portions 3a2 and 3b2 are not shown). For this reason, even though the size of the switched reluctance motor A is increased and tolerance becomes great, adjustment can be performed by the fastening of the bolts 4. Accordingly, it is possible to improve mechanical torque transmission performance.

Accordingly, according to the above-mentioned embodiment, the double stator switched reluctance motor A includes the annular rotor 10, the outer stator 20 that is disposed outside the rotor 10, and the inner stator 30 that is disposed inside the rotor 10. The double stator switched reluctance motor A employs a structure in which the rotor 10 is provided with the bolt fastening holes 14 passing through the rotor 10 in the axial direction and the bolt fastening holes 14 are formed at the positions depending on the magnetic characteristics of the outer and inner stators 20 and 30. Therefore, it is possible to improve mechanical torque transmission performance without a magnetic influence.

For this reason, according to this embodiment, it is possible to improve the performance of the switched reluctance motor A that is inexpensive and excellent in reliability.

Example

The effect of the invention will become more apparent below using an example of the first embodiment. Meanwhile, the invention is not limited to the following example and may be appropriately modified without departing from the scope of the invention.

First, the influence of magnetic characteristics caused by a difference in the positions of the bolt fastening holes 14 of the rotor 10 in the circumferential direction was examined by an electromagnetic analysis test. The electromagnetic analysis conditions were as follows:

[Outer Stator]
  Outer diameter of outer stator: 1000 mm
[Inner Stator]
  Outer diameter of inner stator: 450 mm
[Magnetomotive Force]
  Magnetomotive force: 14000 AT (outer)/7000 AT (inner)
[Bolt Fastening Hole]
  Hole size: 30 mm in diameter
  Position of hole in the radial direction: 300 mm
  Position of hole in the circumferential direction: 0° (=45°), 15° (=30°)

FIGS. 6A, 6B, 7A, and 7B are views showing static magnetic field-analysis results, when the rotor and the stator face each other, depending on the positions of the bolt fastening holes 14 of the example of the first embodiment of the invention in the circumferential direction.

Figure 6A:
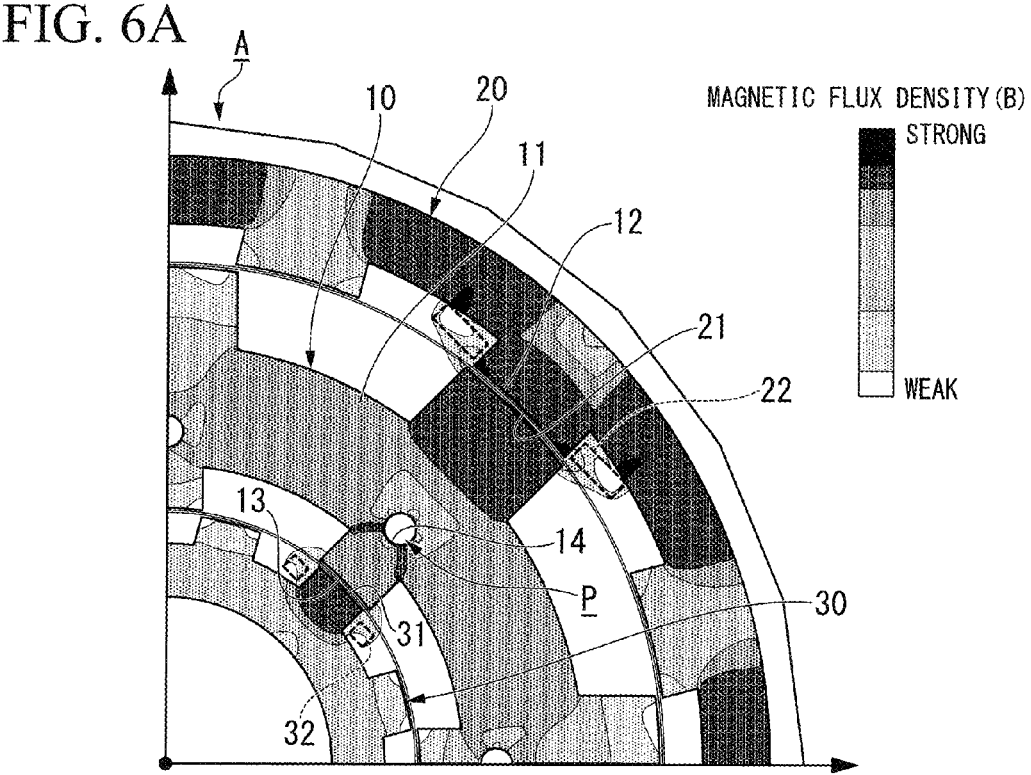
FIG. 6A is a view showing static magnetic field-analysis results, when the rotor and a stator face each other, depending on the positions of bolt fastening holes of an example of the first embodiment of the invention in a circumferential direction.
Figure 6B:
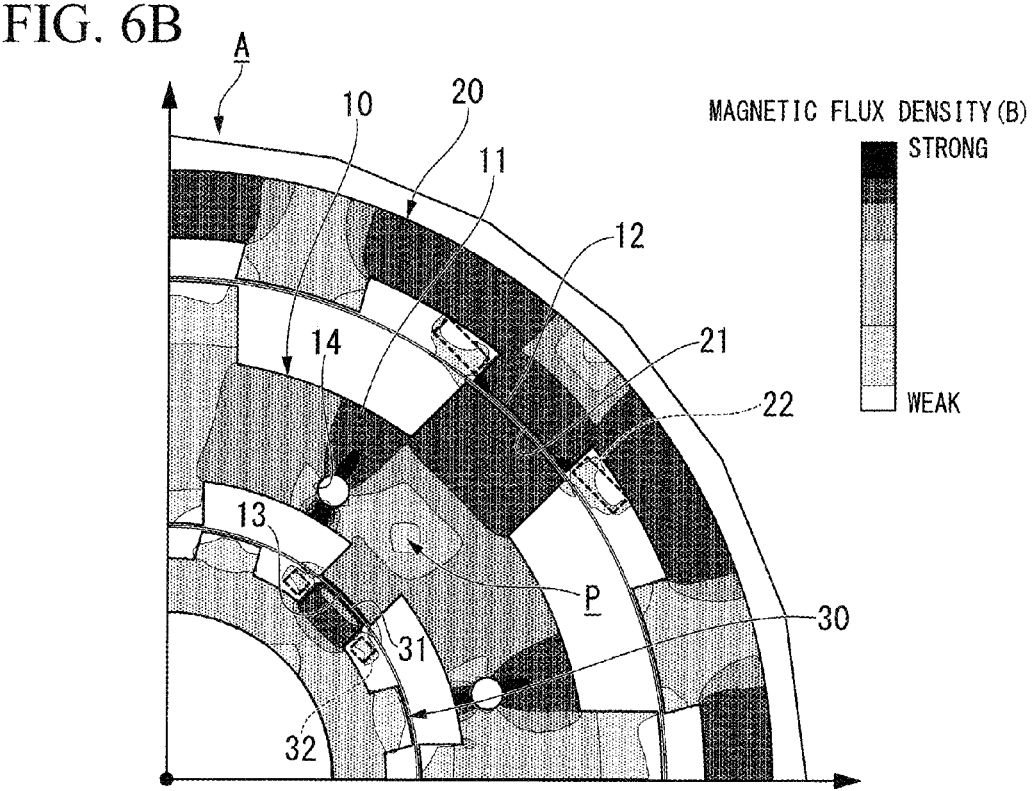
FIG. 6B is a view showing static magnetic field-analysis results, when the rotor and the stator face each other, depending on the positions of the bolt fastening holes of the example of the first embodiment of the invention in the circumferential direction.
Figure 7A:
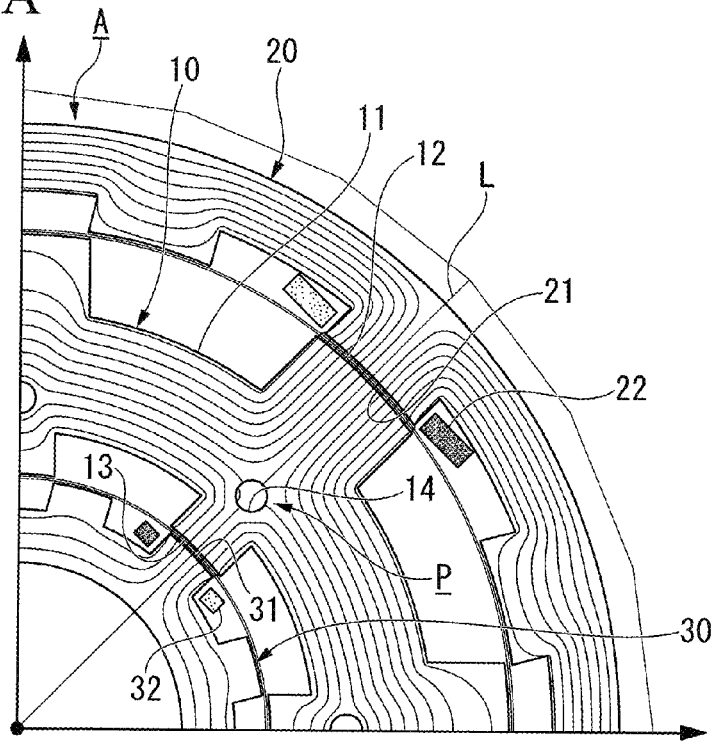
FIG. 7A is a view showing static magnetic field-analysis results, when the rotor and the stator face each other, depending on the positions of the bolt fastening holes of the example of the first embodiment of the invention in the circumferential direction.
Figure 7B:
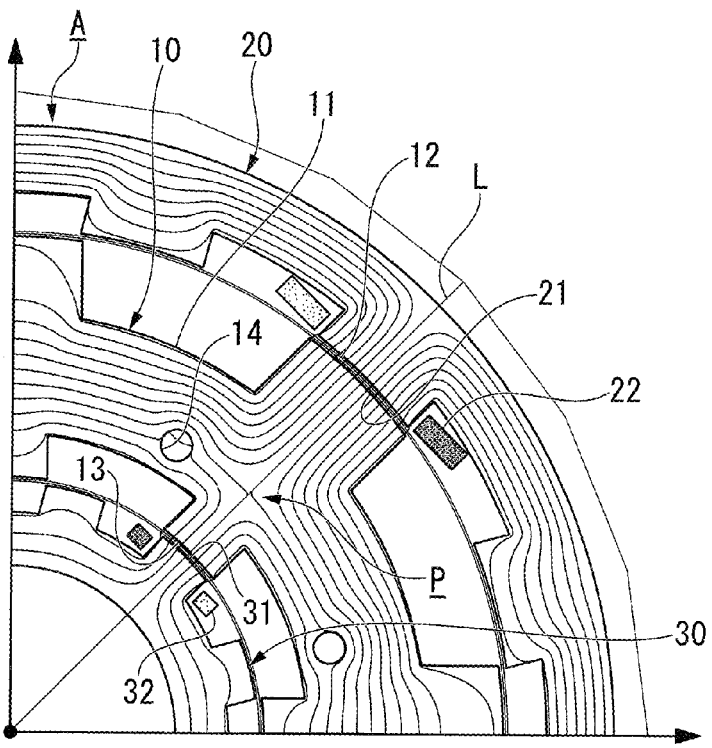
FIG. 7B is a view showing static magnetic field-analysis results, when the rotor and the stator face each other, depending on the positions of the bolt fastening holes of the example of the first embodiment of the invention in the circumferential direction.

The intensity of a magnetic field (B) is shown in FIGS. 6A and 6B by the color density of a dot pattern. The intensity of a magnetic field (B) is shown in FIGS. 7A and 7B by lines of magnetic flux. Further, FIGS. 6A and 7A show results when the bolt fastening hole 14 corresponds to 0° (when the bolt fastening hole is positioned on the center line L), and FIGS. 6B and 7B show results when the bolt fastening hole 14 corresponds to 15°. Meanwhile, when the rotor 10 has a 8-pole structure, the results that are obtained when the bolt fastening hole 14 corresponds to 0° and 45° are the same as the results that are obtained when the bolt fastening hole 14 corresponds to 15° and 30°. Accordingly, one of the cases in which the bolt fastening hole 14 corresponds to 0° and 45° or corresponds to 15° and 30° will not be shown.

It is understood that the first salient poles 12 facing the outer stator 20 and the second salient poles 13 facing the inner stator 30 are portions on which magnetic flux is concentrated but the yoke portion 11 is a portion on which magnetic flux is moderately concentrated as shown in FIGS. 6A and 6B.

Further, since magnetic flux flows into the yoke portion 11 from opposite directions, that is, from both the first salient pole 12 and the second salient pole 13, it is understood that a magnetic neutral point P may be formed between the first salient pole 12 and the second salient pole 13 that have the same phase and are connected to each other. It is understood that magnetic flux density at the magnetic neutral point P is lower than that at the peripheral portion of the magnetic neutral point P as shown in FIGS. 6A and 6B.

Further, since magnetic flux, which has flowed into the yoke portion 11 from both the first and second salient poles 12 and 13 flows along both sides of the yoke portion 11 in the circumferential direction in the same way as shown in FIGS. 7A and 7B, it is understood that a magnetic neutral point P is formed on the center line L connecting the center of the first salient pole 12 with the center of the second salient pole 13 in the radial direction.

For this reason, it is understood that it is difficult for the bolt fastening hole 14 to block the flow of magnetic flux in a case in which the bolt fastening hole 14 corresponds to 0° as shown in FIG. 7A in comparison with a case in which the bolt fastening hole 14 corresponds to 15° as shown in FIG. 7B. Further, it is understood that magnetic flux density does not become extremely high at a portion except for the first and second salient poles 12 and 13 in a case in which the bolt fastening hole 14 corresponds to 0° as shown in FIG. 6A in comparison with a case in which the bolt fastening hole 14 corresponds to 15° as shown in FIG. 6B.

Figure 8:
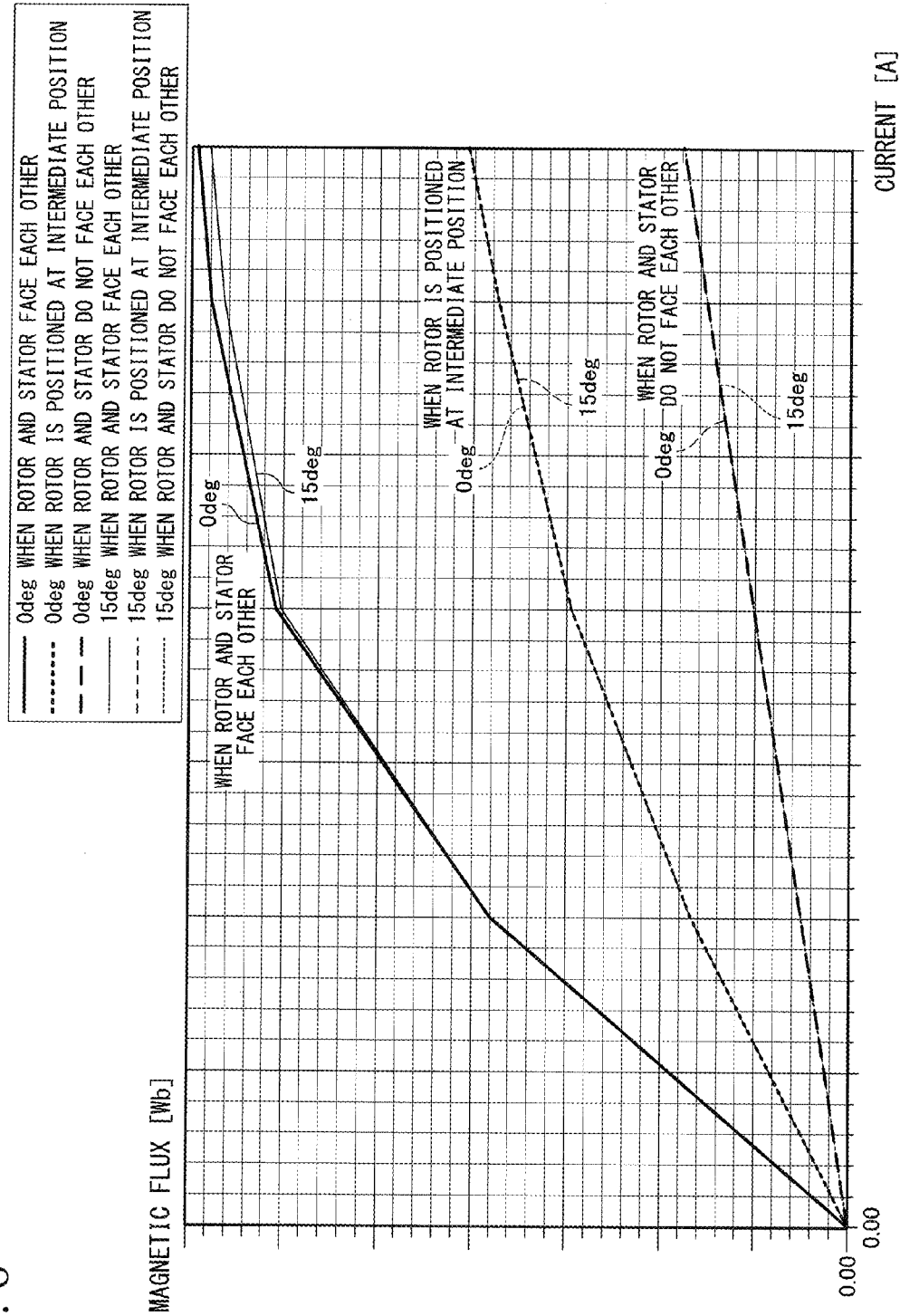
FIG. 8 is a graph showing a relationship between magnetic flux (Wb) and current (A) depending on a difference in the positions of the bolt fastening holes of the example of the first embodiment of the invention in the circumferential direction.

FIG. 8 is a graph showing a relationship between magnetic flux (Wb) and current (A) depending on a difference in the positions of the bolt fastening holes 14 of the example of the invention in the circumferential direction. Meanwhile, "when the rotor and the stator face each other" means when the rotor is positioned at a position that corresponds to 0° with respect to the stator, "when the rotor and the stator do not face each other" means when the rotor is positioned at a position that corresponds to 90° with respect to the stator, and "when the rotor is positioned at an intermediate position" means when the rotor is positioned at an intermediate position between the position of the rotor "when the rotor and the stator face each other" and the position of the rotor "when the rotor and the stator do not face each other".

As shown in FIG. 8, it is understood that there is little difference in the intensity of magnetic flux between "when the rotor and the stator do not face each other" and "when the rotor is positioned at an intermediate position" but magnetic flux is small in a case in which the bolt fastening hole 14 corresponds to 15° in comparison with a case in which the bolt fastening hole corresponds to 0° "when the rotor and the stator face each other".

Next, the influence of magnetic characteristics caused by a difference in the position of the bolt fastening hole 14 of the rotor 10 in the radial direction was examined by an electromagnetic analysis test. The electromagnetic analysis conditions were as follows. Meanwhile, the conditions of the outer stator, the inner stator, current, and the magnetomotive force are the same as the conditions in the above-mentioned electromagnetic analysis test.

[Bolt Fastening Hole]
  Hole size: 30 mm in diameter
  Position of hole in the radial direction: 300 mm, 310 mm, 320 mm
  Position of hole in the circumferential direction: 0°

FIGS. 9A, 9B, 9C, 10A, 10B, and 10C are views showing static magnetic field-analysis results, when the rotor and the stator face each other, depending on the positions of the bolt fastening holes 14 of the example of the first embodiment of the invention in the radial direction.

Figure 9A:
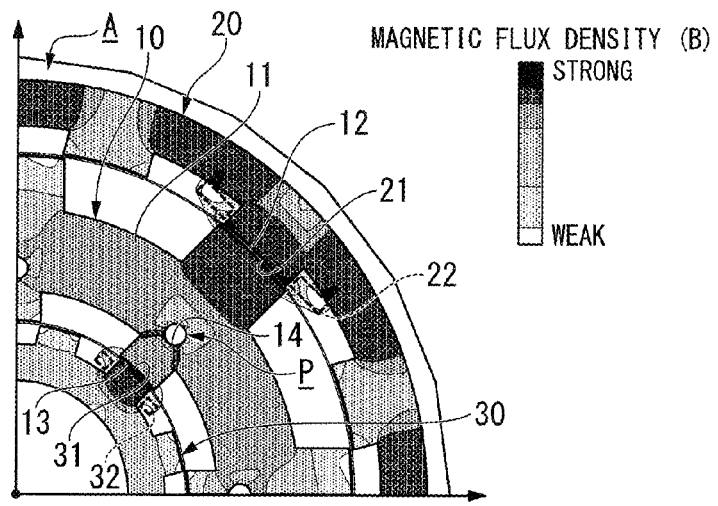
FIG. 9A is a view showing static magnetic field-analysis results, when the rotor and the stator face each other, depending on the positions of the bolt fastening holes of the example of the first embodiment of the invention in a radial direction.
Figure 9B:
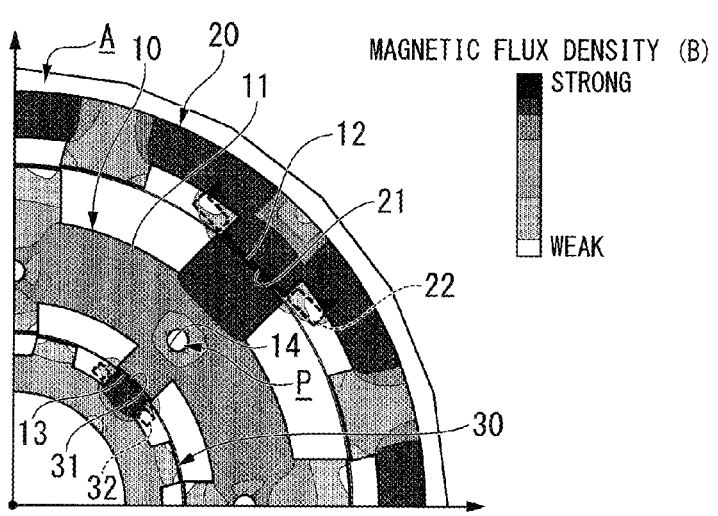
FIG. 9B is a view showing static magnetic field-analysis results, when the rotor and the stator face each other, depending on the positions of the bolt fastening holes of the example of the first embodiment of the invention in the radial direction.
Figure 9C:
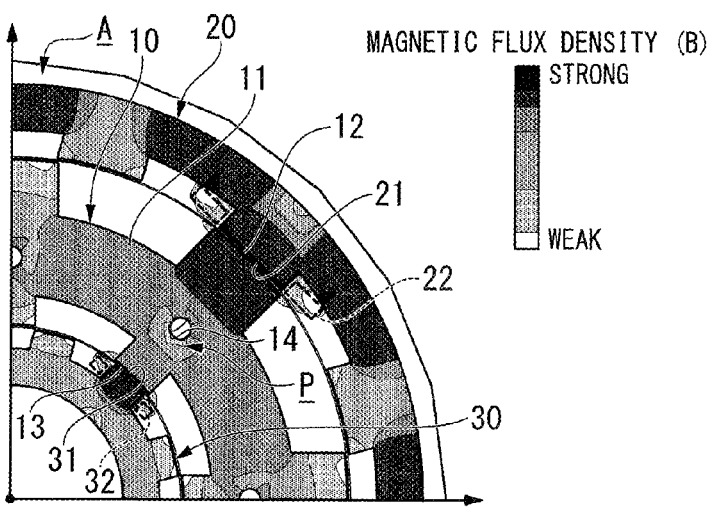
FIG. 9C is a view showing static magnetic field-analysis results, when the rotor and the stator face each other, depending on the positions of the bolt fastening holes of the example of the first embodiment of the invention in the radial direction.
Figure 10A:
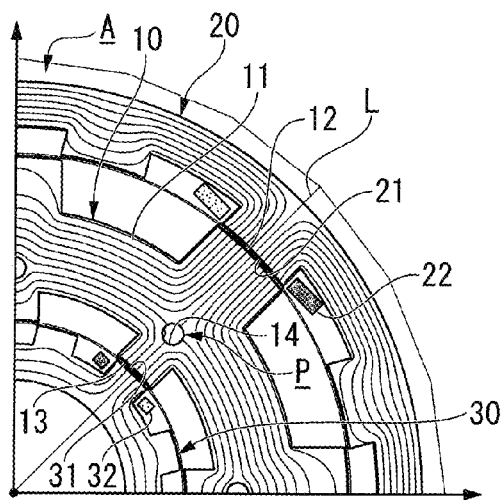
FIG. 10A is a view showing static magnetic field-analysis results, when the rotor and the stator face each other, depending on the positions of the bolt fastening holes of the example of the first embodiment of the invention in the radial direction.
Figure 10B:
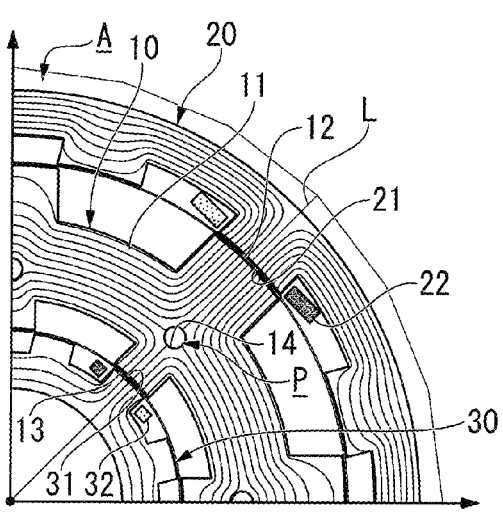
FIG. 10B is a view showing static magnetic field-analysis results, when the rotor and the stator face each other, depending on the positions of the bolt fastening holes of the example of the first embodiment of the invention in the radial direction.
Figure 10C:
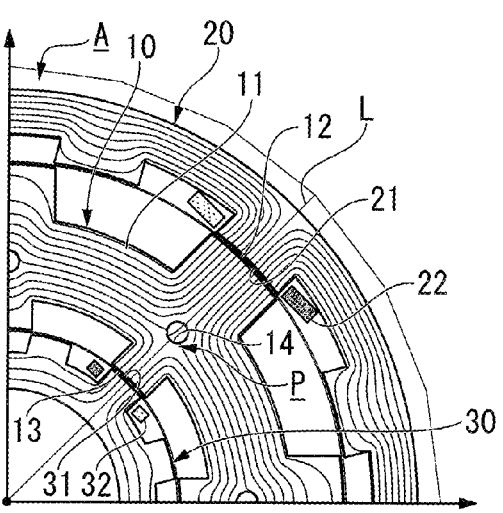
FIG. 10C is a view showing static magnetic field-analysis results, when the rotor and the stator face each other, depending on the positions of the bolt fastening holes of the example of the first embodiment of the invention in the radial direction.

It is understood that a magnetic neutral point P is formed close to the inner stator 30 when the magnetomotive force of the inner stator 30 is set to be smaller than the magnetomotive force of the outer stator 20 as shown in FIGS. 9A, 9B, and 9C.

Further, it is understood that the bolt fastening hole 14 does not significantly block the flow of magnetic flux and magnetic flux density does not become extremely high at a portion except for the first and second salient poles 12 and 13 as long as the bolt fastening hole 14 is positioned in the yoke portion 11 even though being moved in the radial direction as shown in FIGS. 9A, 9B, 9C, 10A, 10B, and 10C.

Figure 11:
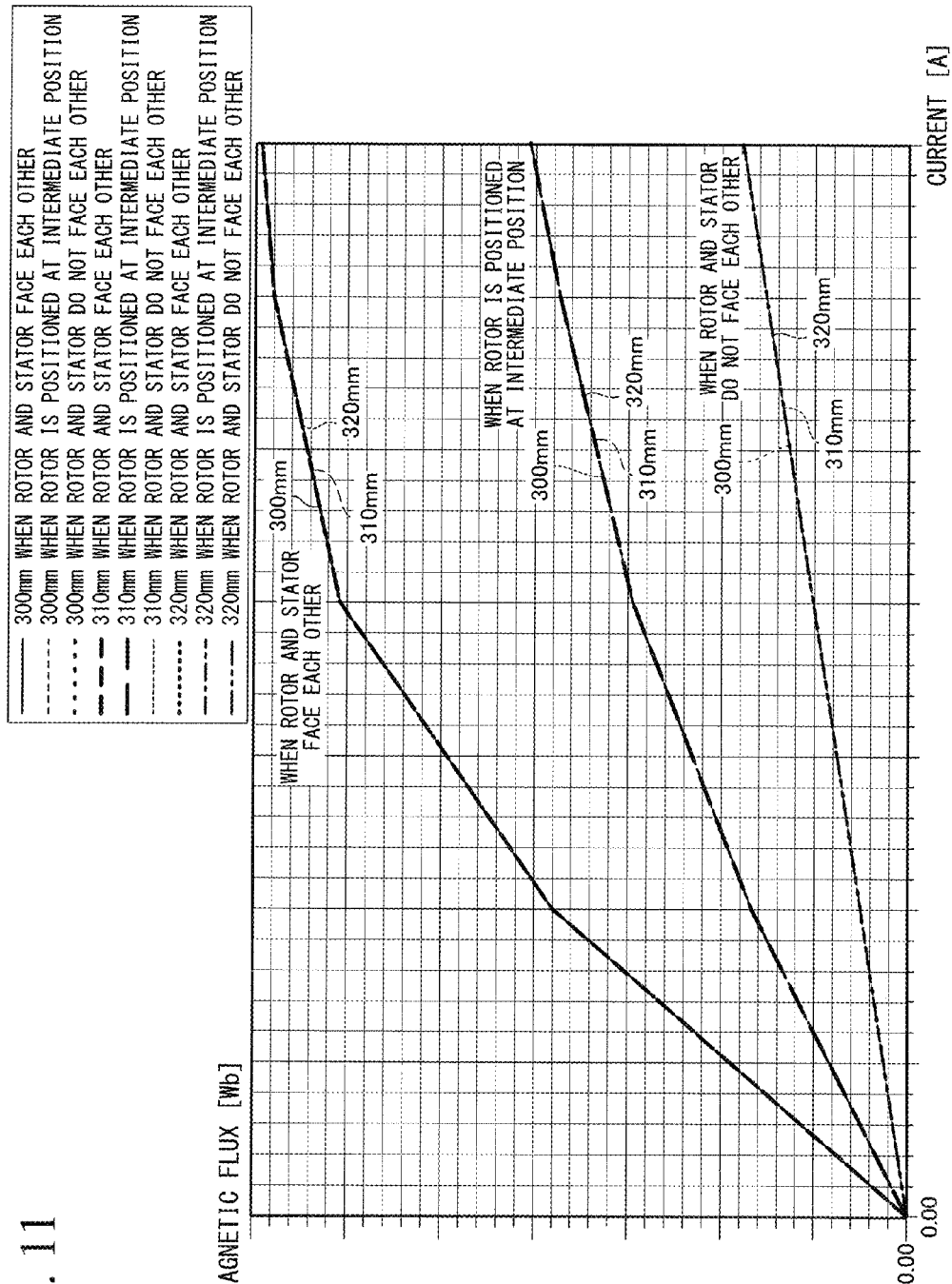
FIG. 11 is a graph showing a relationship between magnetic flux (Wb) and current (A) depending on a difference in the positions of the bolt fastening holes of the example of the first embodiment of the invention in the radial direction.

FIG. 11 is a graph showing a relationship between magnetic flux (Wb) and current (A) depending on a difference in the positions of the bolt fastening holes 14 of the example of the first embodiment of the invention in the radial direction.

As shown in FIG. 11, it is understood that there is little difference in the intensity of magnetic flux even "when the rotor and the stator do not face each other", even "when the rotor is positioned at an intermediate position", or even "when the rotor and the stator face each other". It is understood that the performance of the motor is more sensitive to the arrangement of the bolt fastening holes 14 in the circumferential direction than the radial direction as described above.

According to the above description, it is preferable that each bolt fastening hole 14 is formed close to the inner stator 30 in a region, which connects the first salient pole 12 with the second salient pole 13 in the radial direction, of the yoke portion 11 and is provided on the center line L connecting the center of the first salient pole 12 with the center of the second salient pole 13 in the radial direction. Accordingly, when the bolt fastening holes 14 are set to appropriate positions as described above depending on the magnetic characteristics of the outer and inner stators, the switched reluctance motor A, which is excellent in reliability and of which the performance can be improved, is obtained at a low cost.

Meanwhile, a structure in which only one bolt fastening hole 14 is provided on the center line L is an exemplary example of the first embodiment, but the invention is not limited to this structure. A plurality of bolt fastening holes may be provided on the center line L.

Figure 12:
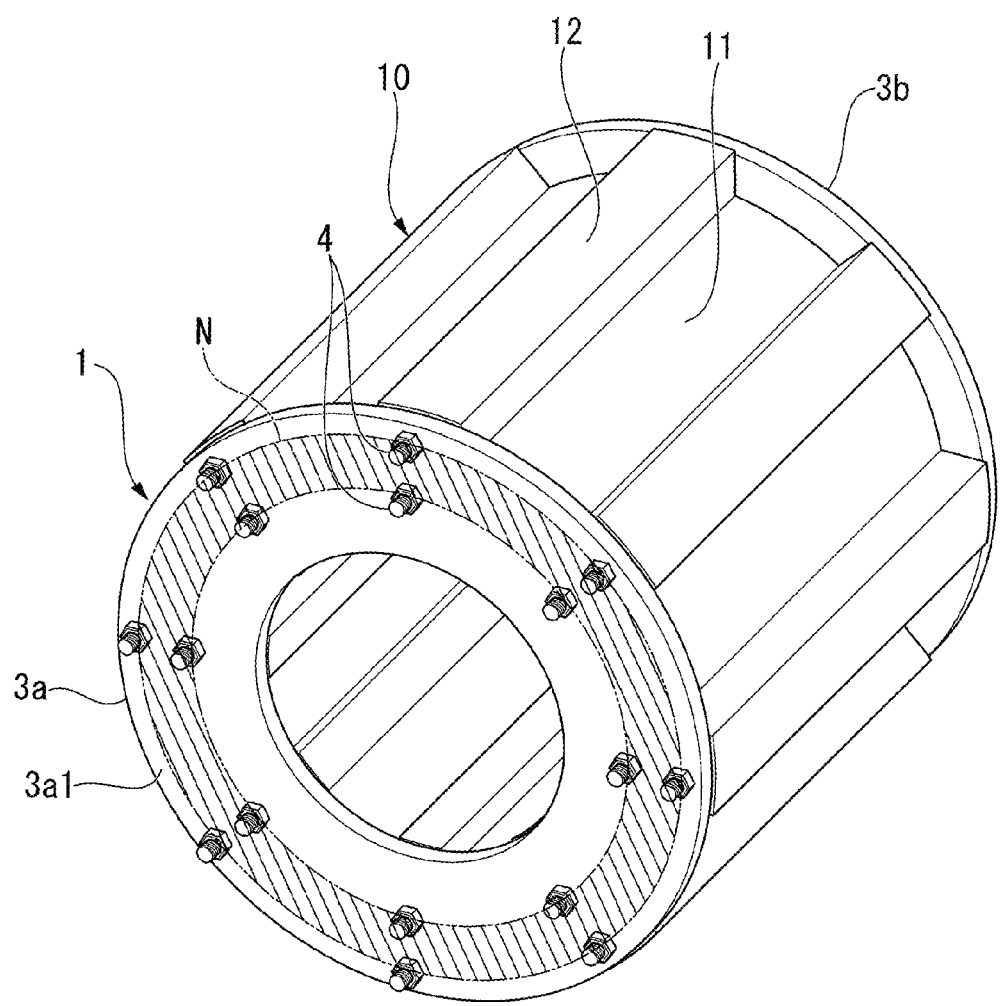
FIG. 12 is a perspective view of a rotor of a modification of the first embodiment of the invention.

That is, according to the above-mentioned example, an influence on magnetic characteristics is less as long as the bolt fastening hole 14 is positioned on the center line L. Accordingly, the number of bolts 4 can be increased as in, for example, a modification of FIG. 12. When a plurality of bolts 4 are arranged in the radial direction, the bolts 4 can firmly fix the rotor base 1 to the rotor 10 with a constant width as denoted by reference character N. Accordingly, it is possible thereby to improve mechanical torque transmission performance in comparison with the embodiment. Further, this structure is particularly effective when the size of the rotating machine is increased.

Second Embodiment

Next, a second embodiment of the invention will be described. In the following description, the same components as the components of the above-mentioned embodiment or components equivalent to the components of the above-mentioned embodiment will be denoted by the same reference numerals and a description thereof will be simplified or omitted.

Figure 13:
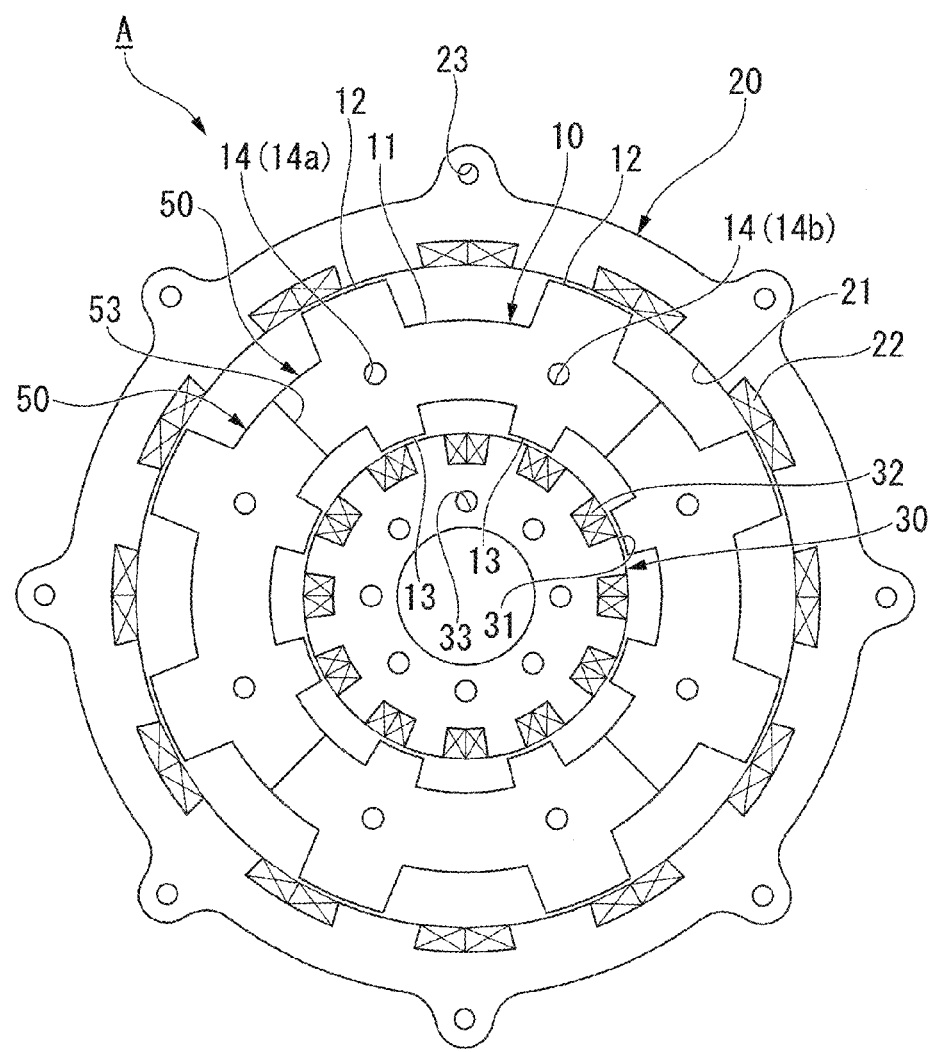
FIG. 13 is a cross-sectional view of a double stator switched reluctance motor according to a second embodiment of the invention.

FIG. 13 is a cross-sectional view of a double stator switched reluctance motor A according to a second embodiment of the invention.

The second embodiment is different from the above-mentioned embodiment in that a rotor 10 is formed by the combination of a plurality of core pieces 50 in a circumferential direction as shown in FIG. 13.

The rotor 10 is formed so that a plurality of electrical steel sheets are fastened and fixed while being laminated in an axial direction. However, when one electrical steel sheet is used, a large electrical steel sheet corresponding to the diameter of the rotor 10 needs to be prepared. When, for example, a large switched reluctance motor A, which rotates with low speed and large torque, is manufactured in the second embodiment, the plurality of core pieces 50 are combined with each other in the circumferential direction to easily form the rotor 10 having a large diameter. When the rotor 10 is formed so as to have a split structure as described above and the size of one core piece 50 is reduced, it is possible to manufacture the rotor 10 having a large diameter without preparing a large electrical steel sheet corresponding to the diameter of the rotor 10.

The core piece 50 includes a plurality of bolt fastening holes 14. The core piece 50 shown in FIG. 13 includes bolt fastening holes 14a and 14b that are formed so as to be spaced apart from each other in the circumferential direction. Further, the core piece 50 includes a plurality of first salient poles 12 and a plurality of second salient poles 13. The core piece 50 is formed in the shape of a yoke portion 11 that is split at portions avoiding the first and second salient poles 12 and 13 in the circumferential direction. Meanwhile, the number of split core pieces 50 of the rotor 10 and the size of the core piece 50 can be appropriately changed depending on the size of the rotor 10 to be manufactured or the size or the number of the electrical steel sheets that can be prepared.

Figure 14:
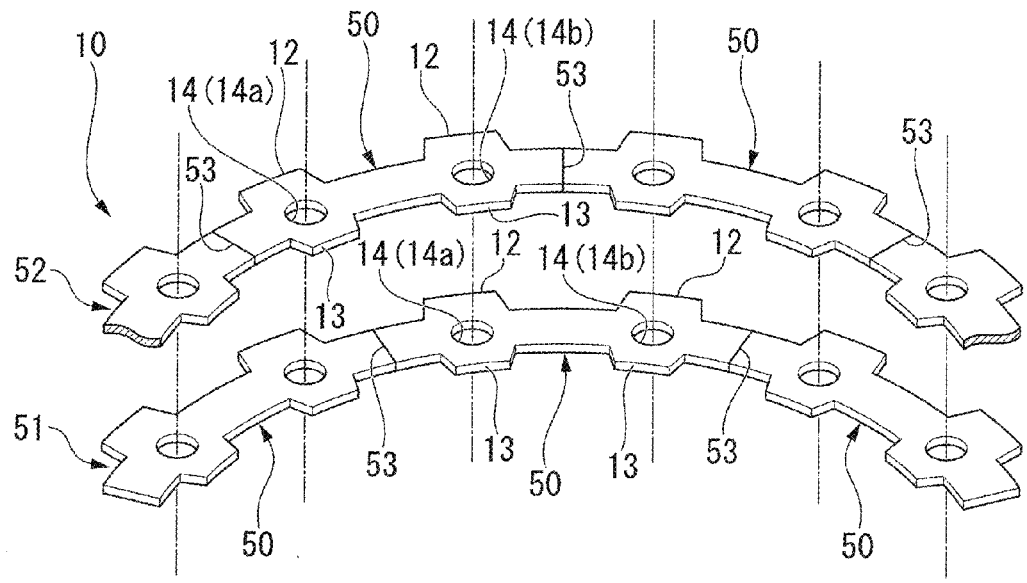
FIG. 14 is a schematic view showing a method of combining core pieces of the second embodiment of the invention.

FIG. 14 is a schematic view showing a method of combining core pieces 50 of the second embodiment of the invention.

The rotor 10 includes first and second layers 51 and 52 that are formed by the combination of the plurality of core pieces 50 in the circumferential direction and are alternately laminated in the axial direction. Here, the first and second layers 51 and 52 are laminated so that the phases of the first and second layers 51 and 52 are shifted from each other in the circumferential direction. In detail, the first and second layers 51 and 52 are laminated so that one (for example, the bolt fastening hole 14a) of the bolt fastening holes 14 formed at the core piece 50 of the first layer 51 faces the other (for example, the bolt fastening hole 14b) of the bolt fastening holes 14 formed at the core piece 50 of the second layer 52, that is, the phases of the first and second layers 51 and 52 are shifted from each other in the circumferential direction.

According to this structure, when bolts 4 are inserted into the bolt fastening holes 14 in the axial direction, the core pieces 50 of the first layer 51 and the core pieces 50 of the second layer 52 are connected and integrated with each other in the circumferential direction and the axial direction. Accordingly, joints 53, which are formed when the core pieces 50 are combined with each other in the circumferential direction, are not lined up in the axial direction. Therefore, when the core piece 50 includes the plurality of bolt fastening holes 14 as shown in FIG. 14, the first and second layers 51 and 52 are laminated so that the bolt fastening holes 14 having different phases face each other in the axial direction, that is, the phases of the first and second layers 51 and 52 are shifted from each other in the circumferential direction. As a result, it is possible to increase the physical strength of the rotor 10.

Since a structure in which the rotor 10 is formed by the combination of the plurality of core pieces 50 in the circumferential direction is employed in the above-mentioned second embodiment as described above, the rotor 10 has a split structure and is formed by the combination of the plurality of core pieces 50 in the circumferential direction. Accordingly, it is possible to easily manufacture the rotor 10 having a large diameter and corresponds to a large rotating machine rotating with low speed and large torque. Further, since the first and second layers 51 and 52 are laminated in the axial direction so that the phases of the first and second layers 51 and 52 are shifted from each other in the circumferential direction, it is possible to sufficiently ensure the physical strength of the rotor 10 having a split structure.

Figure 15:
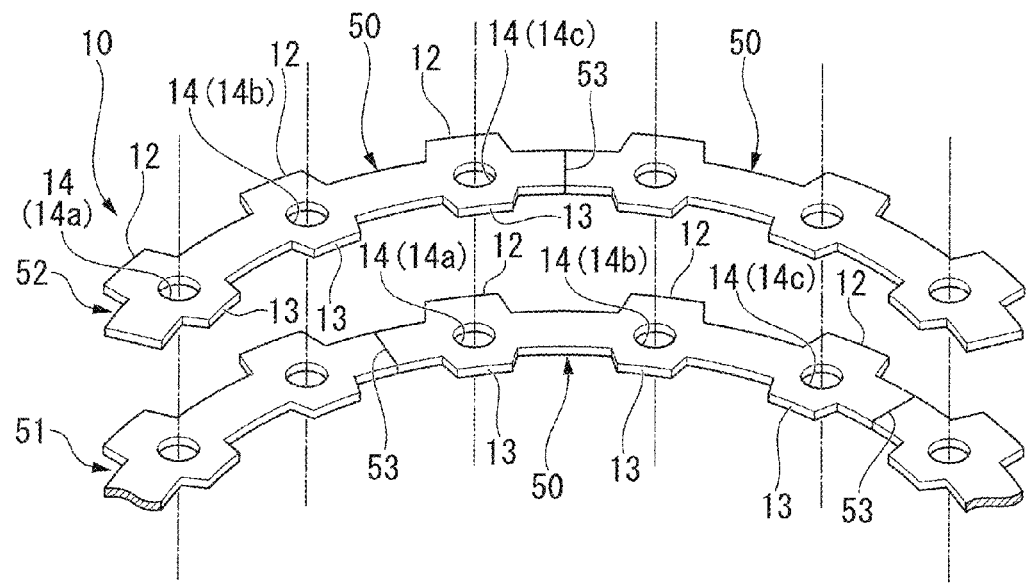
FIG. 15 is a schematic view showing a method of combining core pieces of a modification of the second embodiment of the invention.

Furthermore, a structure shown in FIG. 15 can also be employed in the second embodiment.

Meanwhile, in the following description, the same components as the components of the above-mentioned embodiment or components equivalent to the components of the above-mentioned embodiment will be denoted by the same reference numerals and the description thereof will be simplified or omitted.

FIG. 15 is a schematic view showing a method of combining core pieces 50 of a modification of the second embodiment of the invention.

In this modification, as shown in FIG. 15, the core piece 50 includes bolt fastening holes 14a, 14b, and 14c that are formed so as to be spaced apart from each other in the circumferential direction. First and second layers 51 and 52, which are formed by the combination of the plurality of core pieces 50 in the circumferential direction, are laminated so that the phases of the first and second layers 51 and 52 are shifted from each other in the circumferential direction. In detail, the first and second layers 51 and 52 are laminated so that a specific bolt fastening hole 14 (for example, the bolt fastening hole 14a) formed at the core piece 50 of the first layer 51 faces the bolt fastening hole 14 (for example, the bolt fastening hole 14c), which is formed at the core piece 50 of the second layer 52 and has a different phase, that is, the phases of the first and second layers 51 and 52 are shifted from each other in the circumferential direction.

According to this structure, as described above, when bolts 4 are inserted into the bolt fastening holes 14 in the axial direction, the core pieces 50 of the first layer 51 and the core pieces 50 of the second layer 52 are connected and integrated with each other in the circumferential direction and the axial direction. Accordingly, it is possible to sufficiently ensure the physical strength of the rotor 10 having a split structure in this modification.

Third Embodiment

Next, a third embodiment of the invention will be described. In the following description, the same components as the components of the above-mentioned embodiments or components equivalent to the components of the above-mentioned embodiments will be denoted by the same reference numerals and a description thereof will be simplified or omitted.

Figure 16:
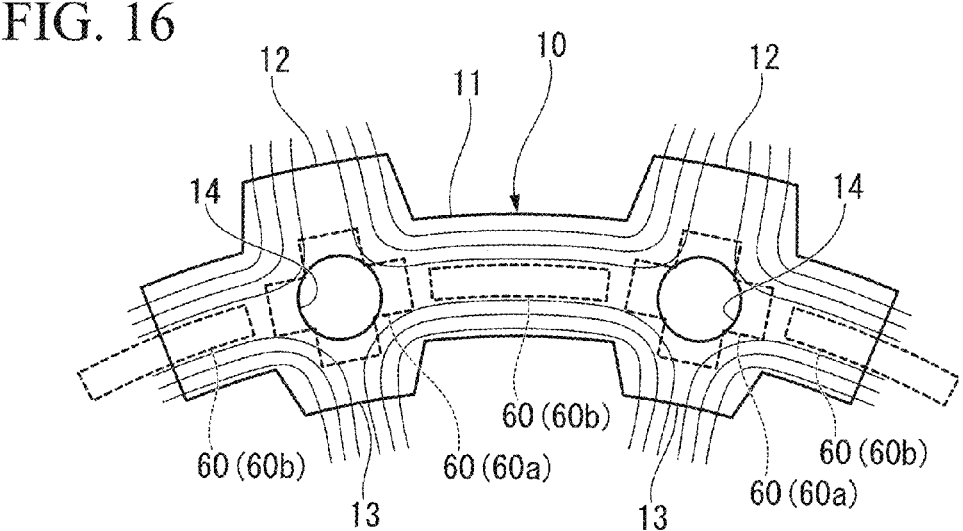
FIG. 16 is an enlarged view showing the shapes of bolt fastening holes that are formed in a rotor of a third embodiment of the invention.

FIG. 16 is an enlarged view showing the shapes of bolt fastening holes 14 that are formed in a rotor 10 of a third embodiment of the invention. Meanwhile, FIG. 16 schematically shows the flow of magnetic flux in the rotor 10.

The third embodiment is different from the above-mentioned embodiments in that the bolt fastening hole 14 has a shape depending on the magnetic characteristics of outer and inner stators 20 and 30 as shown in FIG. 16.

As shown in FIG. 16, regions 60 in which magnetic flux does not relatively flow are present in the rotor 10. The regions 60 are present in a yoke portion 11 on which the concentration of magnetic flux is moderate in comparison with the first salient pole 12 and the second salient pole 13. The region 60 includes a region 60a that is present between the first and second salient poles 12 and 13 connected to each other and a region 60b that is present in the yoke portion 11 when thickness can be sufficiently ensured. Since magnetic flux having flowed into the yoke portion 11 from the first and second salient poles 12 and 13 flows along both sides of the yoke portion 11 in the circumferential direction in the same way, the region 60a is formed in the shape of a cross-shaped bar as shown in FIG. 16. Further, since magnetic flux having flowed from the first and second salient poles 12 and 13 flows in parallel in the region 60b along the yoke portion 11, the region 60b is formed in the shape of a bar as shown in FIG. 16.

Since magnetic flux does not relatively flow in these regions 60, the shape of the bolt fastening hole 14 can be changed in the range of the shape depending on the magnetic characteristics. In third embodiment, the bolt 4 including a rod portion corresponding to the shape of the bolt fastening hole 14 is inserted into the bolt fastening hole 14 of which the shape has been changed. Accordingly, the stiffness of the rotor 10 against torsion and bending is increased without the deterioration of the performance of the motor.

Figure 17:
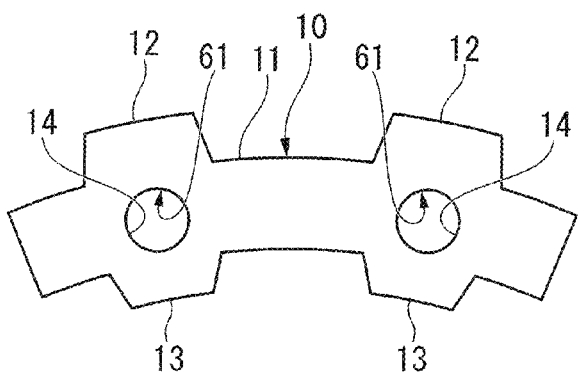
FIG. 17 is a view showing the shapes (pattern 1) of bolt fastening holes of the third embodiment of the invention.

FIG. 17 is a view showing the shapes (pattern 1) of bolt fastening holes 14 of the third embodiment of the invention.

The bolt fastening hole 14 shown in FIG. 17 is formed in the region 60a shown in FIG. 16. The bolt fastening hole 14 formed in the region 60a includes a round hole portion 61. The round hole portion 61 is a circular hole that passes through the yoke portion 11 in the axial direction. The bolt 4, which is to be inserted into the bolt fastening hole 14, includes a rod portion that has a shape corresponding to the shape of the round hole portion 61, and threaded portions to which nuts are fastened are formed at both ends of the rod portion (for example, see FIG. 1).

Figure 18:
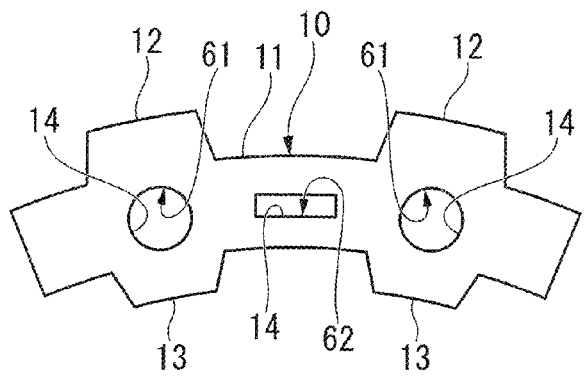
FIG. 18 is a view showing the shapes (pattern 2) of bolt fastening holes of the third embodiment of the invention.

FIG. 18 is a view showing the shapes (pattern 2) of bolt fastening holes 14 of the third embodiment of the invention.

The bolt fastening holes 14 shown in FIG. 18 are formed in the regions 60a shown in FIG. 16 and the region 60b shown in FIG. 16, respectively. The bolt fastening hole 14 formed in the region 60a includes a round hole portion 61. The round hole portion 61 is a circular hole that passes through the yoke portion 11 in the axial direction. The bolt 4, which is to be inserted into the bolt fastening hole 14, includes a rod portion that has a shape corresponding to the shape of the round hole portion 61, and threaded portions to which nuts are fastened are formed at both ends of the rod portion.

Further, the bolt fastening hole 14 formed in the region 60b includes an elongated hole portion 62. The elongated hole portion 62 is a rectangular hole that passes through the yoke portion 11 in the axial direction, and the long sides of the elongated hole portion extend in the circumferential direction of the rotor 10. The bolt 4, which is to be inserted into the bolt fastening hole 14, includes a rod portion that has a shape corresponding to the shape of the round hole portion 61, and threaded portions to which nuts are fastened are formed at both ends of the rod portion.

Figure 19:
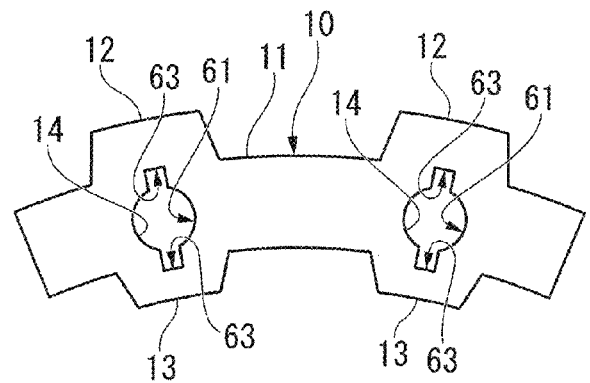
FIG. 19 is a view showing the shapes (pattern 3) of bolt fastening holes of the third embodiment of the invention.

FIG. 19 is a view showing the shapes (pattern 3) of bolt fastening holes 14 of the third embodiment of the invention.

The bolt fastening holes 14 shown in FIG. 19 are formed in the regions 60a shown in FIG. 16. The bolt fastening hole 14 formed in the region 60a includes a round hole portion 61 and first groove portions 63. The round hole portion 61 is a circular hole that passes through the yoke portion 11 in the axial direction. The first groove portion 63 is a recessed groove that is formed on the inner surface of the round hole portion 61 and extends in the axial direction. A pair of first groove portions 63 are formed so as to face each other in the radial direction of the rotor 10 with the central axis of the round hole portion 61 interposed therebetween. The bolt 4, which is to be inserted into the bolt fastening hole 14, includes a rod portion that has a shape corresponding to the shapes of the round hole portion 61 and the first groove portions 63, and threaded portions to which nuts are fastened are formed at both ends of the rod portion.

Figure 20:
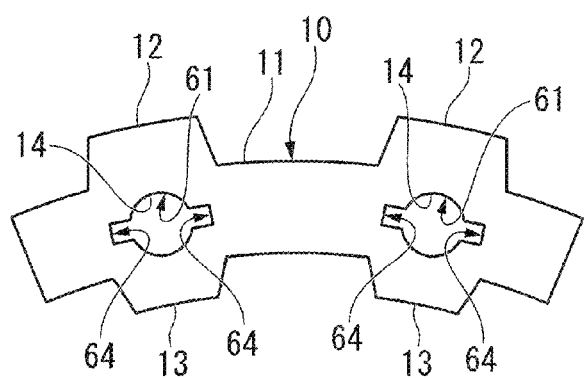
FIG. 20 is a view showing the shapes (pattern 4) of bolt fastening holes of the third embodiment of the invention.

FIG. 20 is a view showing the shapes (pattern 4) of bolt fastening holes 14 of the third embodiment of the invention.

The bolt fastening holes 14 shown in FIG. 20 are formed in the regions 60a shown in FIG. 16. The bolt fastening hole 14 formed in the region 60a includes a round hole portion 61 and second groove portions 64. The round hole portion 61 is a circular hole that passes through the yoke portion 11 in the axial direction. The second groove portion 64 is a recessed groove that is formed on the inner surface of the round hole portion 61 and extends in the axial direction. A pair of second groove portions are formed so as to face each other in the circumferential direction of the rotor 10 with the central axis of the round hole portion 61 interposed therebetween. The bolt 4, which is to be inserted into the bolt fastening hole 14, includes a rod portion that has a shape corresponding to the shapes of the round hole portion 61 and the second groove portions 64, and threaded portions to which nuts are fastened are formed at both ends of the rod portion.

Figure 21:
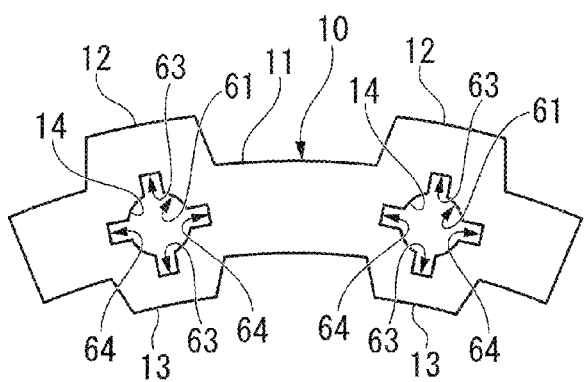
FIG. 21 is a view showing the shapes (pattern 5) of bolt fastening holes of the third embodiment of the invention.

FIG. 21 is a view showing the shapes (pattern 5) of bolt fastening holes 14 of the third embodiment of the invention.

The bolt fastening holes 14 shown in FIG. 21 are formed in the regions 60a shown in FIG. 16. The bolt fastening hole 14 formed in the region 60a includes a round hole portion 61, first groove portions 63, and second groove portions 64. The round hole portion 61 is a circular hole that passes through the yoke portion 11 in the axial direction. The first groove portion 63 is a recessed groove that is formed on the inner surface of the round hole portion 61 and extends in the axial direction. A pair of first groove portions are formed so as to face each other in the radial direction of the rotor 10 with the central axis of the round hole portion 61 interposed therebetween. The second groove portion 64 is a recessed groove that is formed on the inner surface of the round hole portion 61 and extends in the axial direction. A pair of second groove portions 64 are formed so as to face each other in the circumferential direction of the rotor 10 with the central axis of the round hole portion 61 interposed therebetween. The bolt 4, which is to be inserted into the bolt fastening hole 14, includes a rod portion that has a shape corresponding to the shapes of the round hole portion 61 and the first and second groove portions 63 and 64, and threaded portions to which nuts are fastened are formed at both ends of the rod portion.

Figure 22:
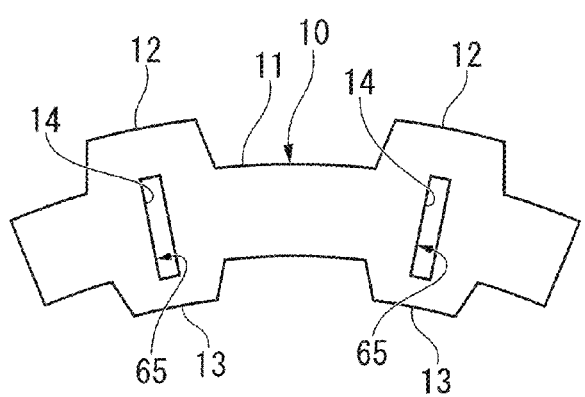
FIG. 22 is a view showing the shapes (pattern 6) of bolt fastening holes of the third embodiment of the invention.

FIG. 22 is a view showing the shapes (pattern 6) of bolt fastening holes 14 of the third embodiment of the invention.

The bolt fastening holes 14 shown in FIG. 22 are formed in the regions 60a shown in FIG. 16. The bolt fastening hole 14 formed in the region 60a includes a first elongated hole portion 65. The first elongated hole portion 65 is a rectangular hole that passes through the yoke portion 11 in the axial direction, and the long sides of the first elongated hole portion 65 extend in the radial direction of the rotor 10. The bolt 4, which is to be inserted into the bolt fastening hole 14, includes a rod portion that has a shape corresponding to the first elongated hole portion 65, and threaded portions to which nuts are fastened are formed at both ends of the rod portion.

Figure 23:
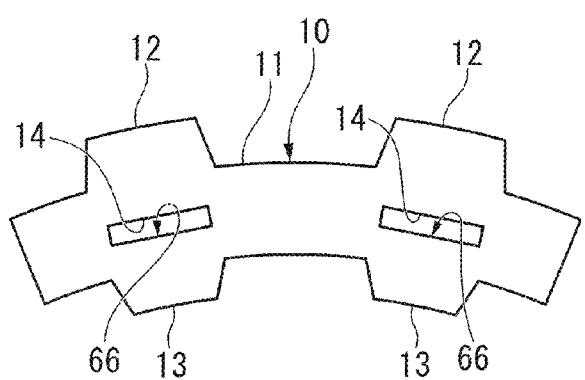
FIG. 23 is a view showing the shapes (pattern 7) of bolt fastening holes of the third embodiment of the invention.

FIG. 23 is a view showing the shapes (pattern 7) of bolt fastening holes 14 of the third embodiment of the invention.

The bolt fastening holes 14 shown in FIG. 23 are formed in the regions 60a shown in FIG. 16. The bolt fastening hole 14 formed in the region 60a includes a second elongated hole portion 66. The second elongated hole portion 66 is a rectangular hole that passes through the yoke portion 11 in the axial direction, and the long sides of the second elongated hole portion 66 extend in the circumferential direction of the rotor 10. The bolt 4, which is to be inserted into the bolt fastening hole 14, includes a rod portion that has a shape corresponding to the second elongated hole portion 66, and threaded portions to which nuts are fastened are formed at both ends of the rod portion.

Figure 24:
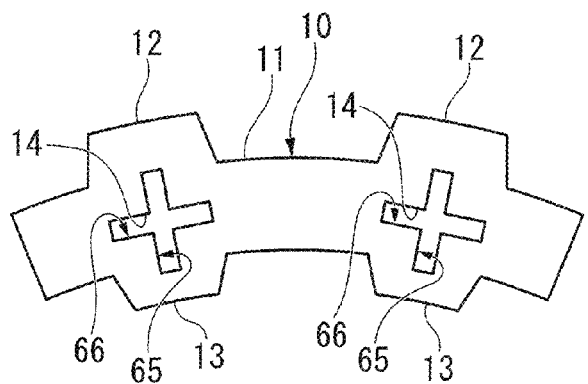
FIG. 24 is a view showing the shapes (pattern 8) of bolt fastening holes of the third embodiment of the invention.

FIG. 24 is a view showing the shapes (pattern 8) of bolt fastening holes 14 of the third embodiment of the invention.

The bolt fastening holes 14 shown in FIG. 24 are formed in the regions 60a shown in FIG. 16. The bolt fastening hole 14 formed in the region 60a includes a first elongated hole portion 65 and a second elongated hole portion 66. The first elongated hole portion 65 is a rectangular hole that passes through the yoke portion 11 in the axial direction, and the long sides of the first elongated hole portion 65 extend in the radial direction of the rotor 10. The second elongated hole portion 66 is a rectangular hole that passes through the yoke portion 11 in the axial direction, and the long sides of the second elongated hole portion 66 extend in the circumferential direction of the rotor 10. The second elongated hole portion 66 is orthogonal to the first elongated hole portion 65. The bolt 4, which is to be inserted into the bolt fastening hole 14, includes a rod portion that has a shape corresponding to the second elongated hole portion 66, and threaded portions to which nuts are fastened are formed at both ends of the rod portion.

Meanwhile, considering the flow of magnetic flux shown in FIG. 16, the bolt fastening hole 14 can employ shapes other than the shapes shown in FIGS. 17 to 24.

Example

The effect of the invention will become more apparent below using an example of the third embodiment. Meanwhile, the invention is not limited to the following example and may be appropriately modified without departing from the scope of the invention.

Figure 25:
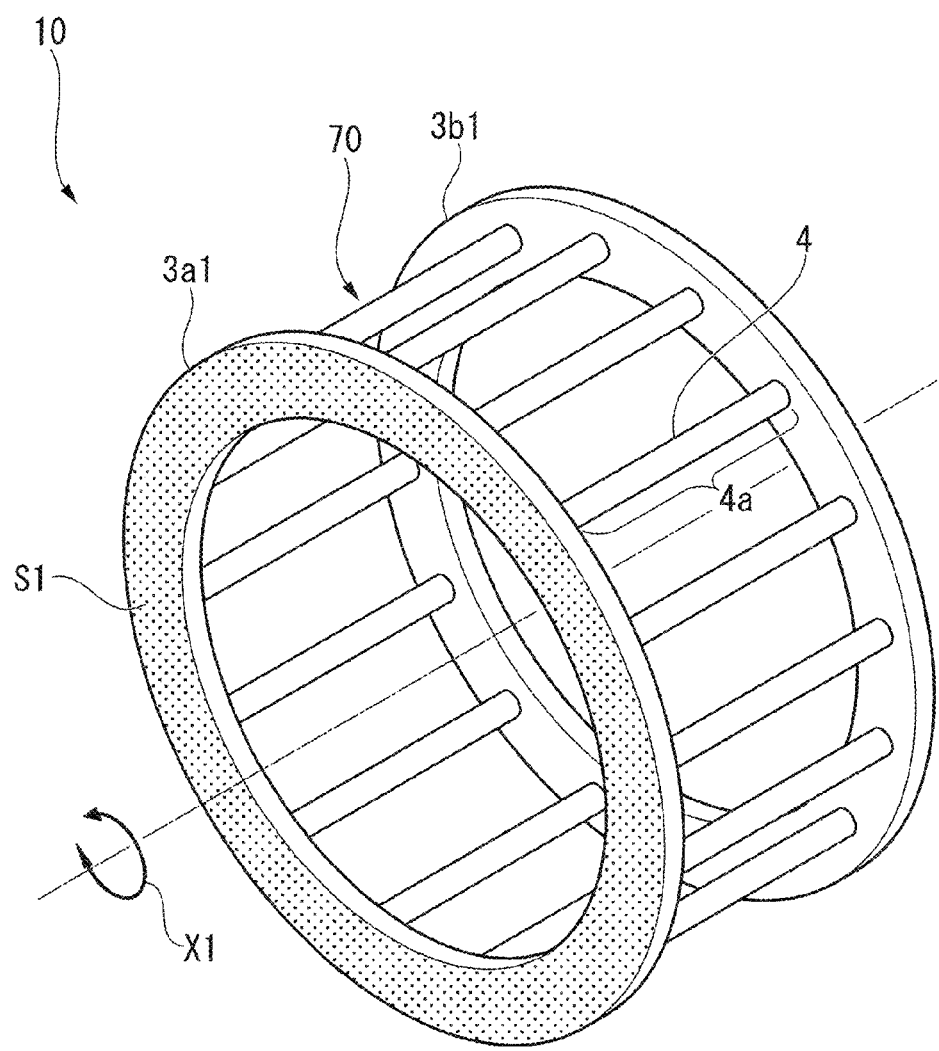
FIG. 25 is a view showing an analytical model of a rotor of an example of the third embodiment of the invention.

In this example, stiffness depending on a difference in the shapes of the bolt fastening holes 14 of the rotors 10 shown in FIGS. 17 to 24 was examined using an analytical model 70 shown in FIG. 25. Further, the relative stiffness, the relative electromagnetic characteristics, and the relative manufacturability of the rotor 10 and the comprehensive evaluation thereof were summarized in a table shown in FIG. 26. Meanwhile, the evaluation of stiffness is evaluation of torsion and bending that will be described below. Furthermore, electromagnetic characteristics are evaluation relative to the flow of magnetic flux shown in FIGS. 7A and 7B. Moreover, manufacturability is evaluation of workability and assemblability.

FIG. 25 is a view showing an analytical model 70 of a rotor 10 of the example of the third embodiment of the invention.

As shown in FIG. 25, the analytical model 70 includes a plurality of bolts 4 and a pair of flange portions 3a1 and 3b1. The pair of flange portions 3a1 and 3b1 are end plates of the rotor 10, and are formed in an annular shape. The bolt 4 is to connect the pair of flange portions 3a1 and 3b1, and includes a rod portion 4a that has a shape corresponding to the shape of the bolt fastening hole 14 shown in FIGS. 17 to 24 (a rod portion 4a having a shape corresponding to the shape of the pattern 1 shown in FIG. 17 in FIG. 25).

An analytical condition, which is required for the relative and simple comparison of torsional stiffness, is that one of the pair of flange portions 3a1 and 3b1 is fixed and torsion X1 is applied to the other thereof. In detail, constant torque is applied to the entire surface S1, which faces the outside in the axial direction, of the flange portion 3a1, and the entire surface (not shown), which faces the outside in the axial direction, of the flange portion 3b1 is fixed. Further, an analytical condition, which is required for the relative and simple comparison of bending stiffness, is that one of the pair of flange portions 3a1 and 3b1 is fixed and a constant load is applied downward in the vertical direction. In detail, the entire surface (not shown), which faces the outside in the axial direction, of the flange portion 3b1 is fixed, and a constant load is applied downward to the analytical model in the vertical direction while the analytical model is supported in the form of a cantilever.

FIG. 26 comparatively shows the stiffness, the electromagnetic characteristics, and the manufacturability of the rotor 10 and an overall evaluation thereof depending on the differences in the shapes of the bolt fastening holes 14 of the example of the third embodiment of the invention. Meanwhile, since the relative comparison of stiffness under a certain condition has been shown, there is also a possibility that the comparison results may be changed depending on the shape of the actual rotor 10.

In FIG. 26, the four evaluations are indicated by a double circle, a circle, a triangle, and a cross mark with the double circle being the highest. Meanwhile, since the precondition of the comprehensive evaluation is to satisfy stiffness and electromagnetic characteristics, the bolt fastening hole 14 (see FIG. 22) of the pattern 6 is not evaluated.

As shown in FIG. 26, the stiffness of the rotor 10 was highest in the case of the bolt fastening hole 14 (see FIG. 21) of the pattern 5. Further, the best results in terms of electromagnetic characteristics of the rotor 10 were achieved in the case of the bolt fastening hole 14 (see FIG. 17) of the pattern 1. Furthermore, the best results in terms of manufacturability (workability and assemblability) of the rotor 10 were achieved in the case of the bolt fastening hole 14 (see FIG. 17) of the pattern 1. The best results in teens of overall evaluation of the rotor 10 were achieved in the case of the bolt fastening hole 14 (see FIG. 20) of the pattern 4.

Meanwhile, manufacturability was best in the case of the bolt fastening hole 14 (see FIG. 17) of the pattern 1. However, in this case, the size of the bolt fastening hole 14 needs to be determined in consideration of the stiffness and the electromagnetic characteristics (the flow of magnetic flux) of the rotor 10. Accordingly, overall evaluation was rated as a triangle in the case of the bolt fastening hole 14 (see FIG. 17) of the pattern 1.

As described above, in order to improve the stiffness of the rotor 10, it is preferable to employ the bolt fastening hole 14 (see FIG. 21) of the pattern 5. Further, in order to improve the manufacturability of the rotor 10, it is preferable to employ the bolt fastening hole 14 (see FIG. 17) of the pattern 1. Furthermore, in order to satisfy both the stiffness and the manufacturability of the rotor 10, it is preferable to employ the bolt fastening hole 14 (see FIG. 20) of the pattern 4.

Meanwhile, the bolt fastening hole 14 (see FIG. 22) of the pattern 6 does not satisfy stiffness in this evaluation, but there is a possibility that stiffness may be satisfied by an increase in the dimension of the bolt fastening hole 14 in the width direction. Meanwhile, since the bolt fastening holes 14 of the patterns 1 to 8 have advantages and disadvantages as shown in FIG. 26, any shape can also be employed depending on the specifications of the rotor 10.

According to the above description, a structure in which the bolt fastening hole 14 has a shape depending on the magnetic characteristics of the outer and inner stators 20 and 30 is employed and the bolt fastening hole 14 is formed in an appropriate shape depending on the magnetic characteristics of the outer and inner stators 20 and 30. Accordingly, it is possible to prevent a magnetic influence and to change the shape of the bolt 4, which is to be inserted into the bolt fastening hole 14, into a different shape in a range that is not affected magnetically. Therefore, it is possible to increase the stiffness of the rotor 10 against torsion and bending.

Fourth Embodiment

Next, a fourth embodiment of the invention will be described. In the following description, the same components as the components of the above-mentioned embodiments or components equivalent to the components of the above-mentioned embodiments will be denoted by the same reference numerals and a description thereof will be simplified or omitted.

Figure 27:
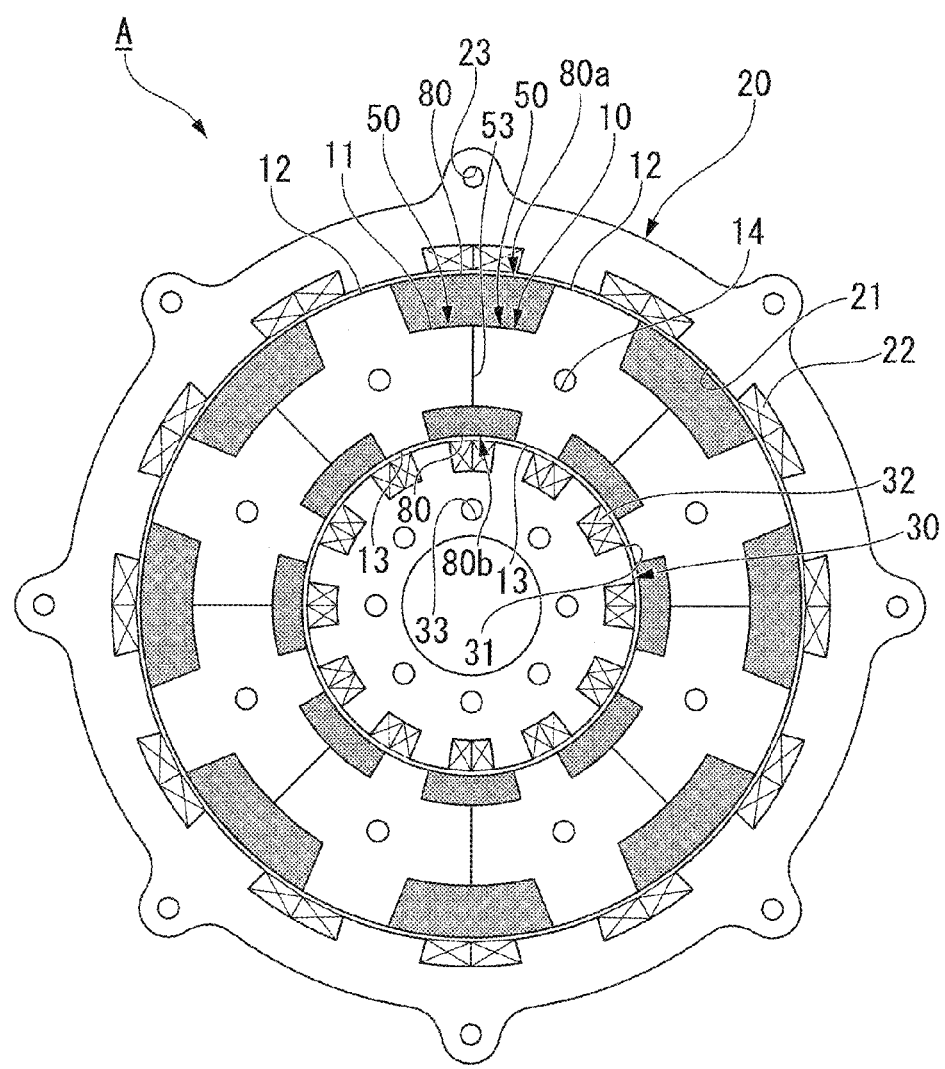
FIG. 27 is the cross-section of a double stator switched reluctance motor A according to a fourth embodiment of the invention.
Figure 28:
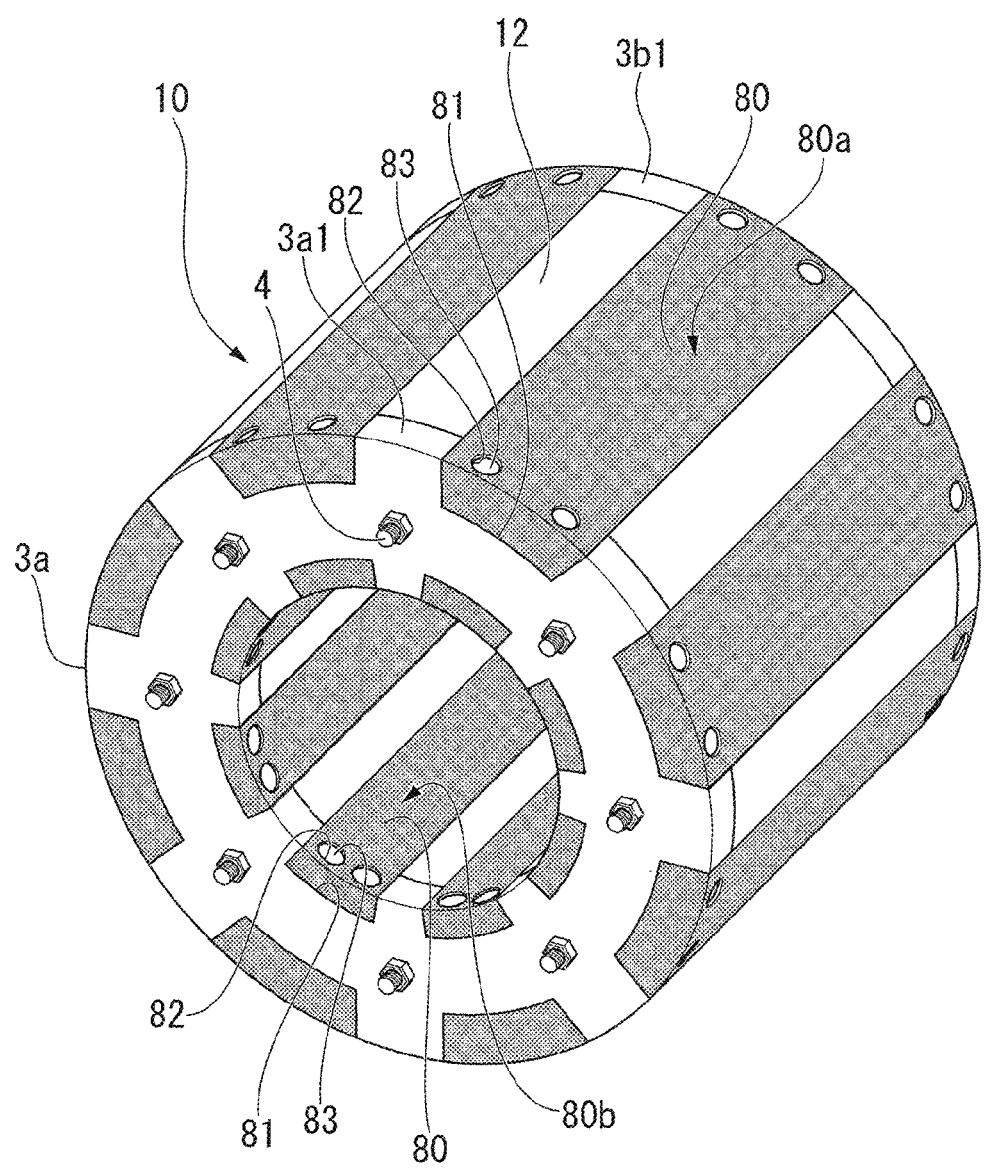
FIG. 28 is a perspective view of a rotor of the fourth embodiment of the invention.

FIG. 27 is a cross-sectional view of a double stator switched reluctance motor A according to a fourth embodiment of the invention. FIG. 28 is a perspective view of a rotor 10 of the fourth embodiment of the invention.

The fourth embodiment is different from the above-mentioned embodiments in that the rotor 10 includes core pressing members 80 that are provided on at least one (both in this embodiment) of the outside and inside thereof in the radial direction and press joints 53 at which a plurality of core pieces 50 are combined with each other as shown in FIGS. 27 and 28.

Since the joints 53 of the core pieces 50 are formed when the split structure of the rotor 10 of the above-mentioned second embodiment is employed, the strength of the rotor 10 is lower than that of the integrated rotor 10 of the above-mentioned first embodiment. The core pressing members 80 are provided in the fourth embodiment to ensure sufficient strength of the rotor 10 when the split structure is employed in the rotor 10.

Meanwhile, the core piece 50 shown in FIG. 27 is formed in the shape of a split piece of the rotor 10 so as to include one first salient pole 12, one second salient pole 13, and one bolt fastening hole 14, but may be formed in the shape of a split piece of the rotor 10 so as to include two first salient poles 12, two second salient poles 13, and two bolt fastening holes 14 as shown in, for example, FIG. 13.

As shown in FIG. 27, the core pressing members 80 are disposed so as to press the joints 53, at which the core pieces 50 are combined with each other, in the radial direction. The core pressing members 80 have the shape of a segment (or a bow), and are disposed between the first salient poles 12 that are adjacent to each other in the circumferential direction and between the second salient poles 13 that are adjacent to each other in the circumferential direction. The core pressing member 80, which is disposed between the first salient poles 12 adjacent to each other in the circumferential direction, has a thickness equal to the height of the first salient pole 12, and includes an outer peripheral surface 80a that forms the outer peripheral surface of the rotor 10 having the same radius as the first salient pole 12. Meanwhile, the core pressing member 80, which is disposed between the second salient poles 13 adjacent to each other in the circumferential direction, has a thickness equal to the height of the second salient pole 13, and includes an inner peripheral surface 80b that forms the inner peripheral surface of the rotor 10 having the same radius as the second salient pole 13. When the core pressing members 80 are arranged as described above so that the shape of the rotor 10 has an annular shape, it is possible to prevent the occurrence of windage loss during the rotation of the rotor 10 in comparison with the shape of the rotor 10 shown in FIG. 2.

As shown in FIG. 28, the core pressing members 80 are fixed to the pair of flange portions 3a1 and 3b1. The pair of flange portions 3a1 and 3b1 are provided with groove portions 81 that support both end portions of the core pressing members 80. The groove portions 81 have shapes corresponding to the shapes of the core pressing members 80. Threaded holes (not shown), which are used to fasten the core pressing members 80 by screws, are formed in the groove portions 81 in the radial direction. The core pressing member 80 includes through holes 82 that are formed at portions of the core pressing member 80 supported by the groove portions 81 and pass through the core pressing member 80 in a thickness direction. Counterbored holes in which the heads of bolts 83 are embedded are formed in the through holes 82, and the core pressing members 80 are fastened and fixed to the pair of flange portions 3a1 and 3b1 by the bolts 83 that are inserted into the through holes 82. The core pressing member 80 is made of, for example, a metal material such as SUS, or a resin material such as fiber reinforced plastic.

According to the fourth embodiment having the above-mentioned structure, a structure in which the rotor 10 includes the core pressing members 80 that are provided on at least one of the outside and inside thereof in the radial direction and press joints 53 at which the plurality of core pieces 50 are combined with each other is employed and the joints 53 of the rotor 10 having the split structure are pressed by the core pressing members 80. Accordingly, it is possible to sufficiently ensure the strength of the entire rotor 10. Further, according to the fourth embodiment having the above-mentioned structure, the core pressing members 80 are arranged and are embedded in the grooves between the first salient poles 12 adjacent to each other in the circumferential direction and between the second salient poles 13 adjacent to each other in the circumferential direction so that the rotor 10 has an annular shape. Accordingly, it is possible to prevent the occurrence of windage loss during the rotation of the rotor 10.

Example

The effect of the invention will become more apparent below using an example of the third embodiment. Meanwhile, the invention is not limited to the following example and may be appropriately modified without departing from the scope of the invention.

In this example, a relationship between the shape of the core pressing member 80 and an eddy-current loss, when the core pressing member 80 is made of a metal material such as SUS304 of JIS, was subjected to an analysis test.

Figure 29:
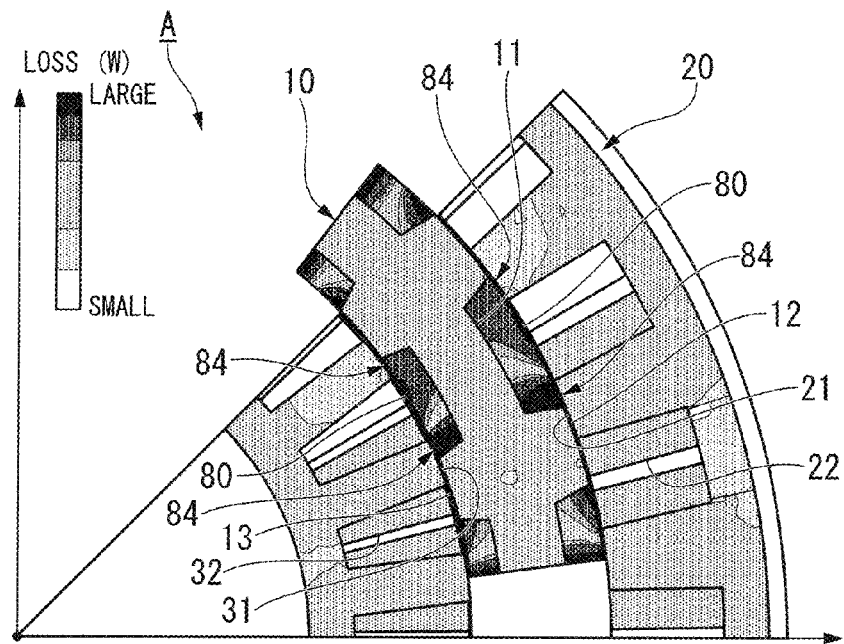
FIG. 29 is a view showing analysis results representing a relationship between the shape of a core pressing member of an example of the fourth embodiment of the invention and loss distribution.
Figure 30:
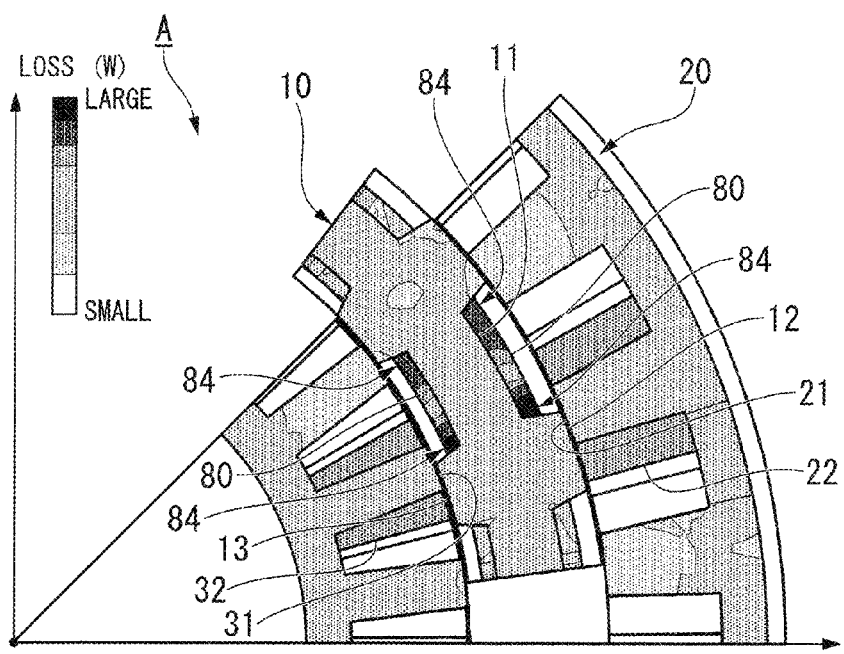
FIG. 30 is a view showing analysis results representing a relationship between the shape of the core pressing member of the example of the fourth embodiment of the invention and loss distribution.
Figure 31:
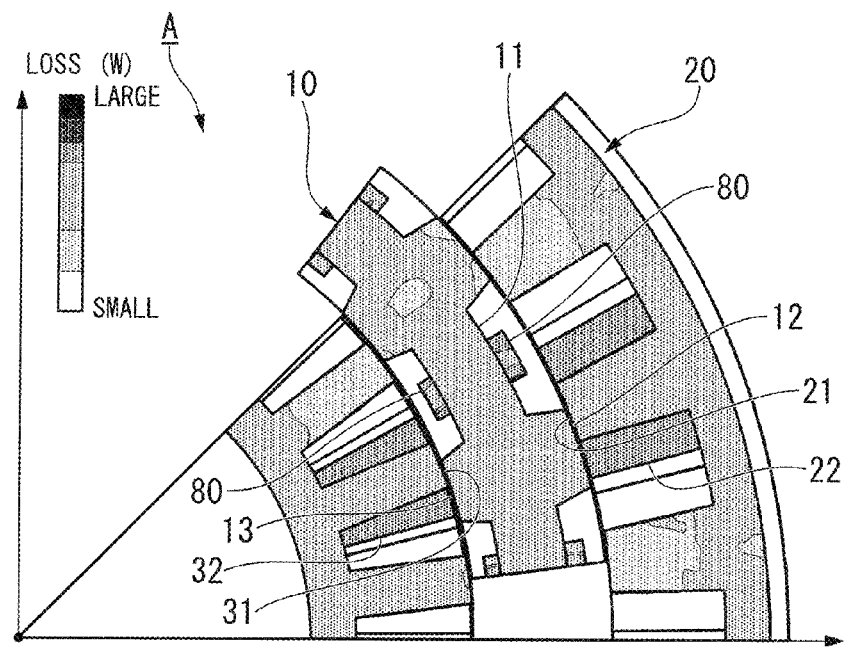
FIG. 31 is a view showing analysis results representing a relationship between the shape of the core pressing member of the example of the fourth embodiment of the invention and loss distribution.

FIGS. 29, 30, and 31 are views showing analysis results representing a relationship between the shape of the core pressing member 80 of the example of the fourth embodiment of the invention and loss distribution.

The intensity of loss distribution (copper loss+iron loss+eddy-current loss) is shown in FIGS. 29, 30, and 31 by the color density of a dot pattern. Further, FIGS. 29, 30, and 31 show results when the rotor 10 corresponds to an angle of 7.5°.

It is understood that an eddy-current loss occurs at adjacent portions 84 adjacent to the first and second salient poles 12 and 13 in the core pressing member 80 having the shape shown in FIG. 29 and a loss is increased. Since the eddy-current loss causes a result that is a thousand times or more greater than other losses (a copper loss and an iron loss), the ratio of the eddy-current loss to the loss is very large.

It is understood that a loss caused by an eddy-current loss in the core pressing member 80 having the shape shown in FIG. 30 is smaller than that in the core pressing member 80 having the shape shown in FIG. 29. The core pressing member 80 shown in FIG. 30 has a shape in which the thickness of the core pressing member 80 shown in FIG. 29 is reduced by half. For this reason, a part of the adjacent portions 84, at which magnetic flux greatly changes, of the core pressing member 80 are removed. Therefore, it is possible to reduce eddy-current loss.

Figure 32:
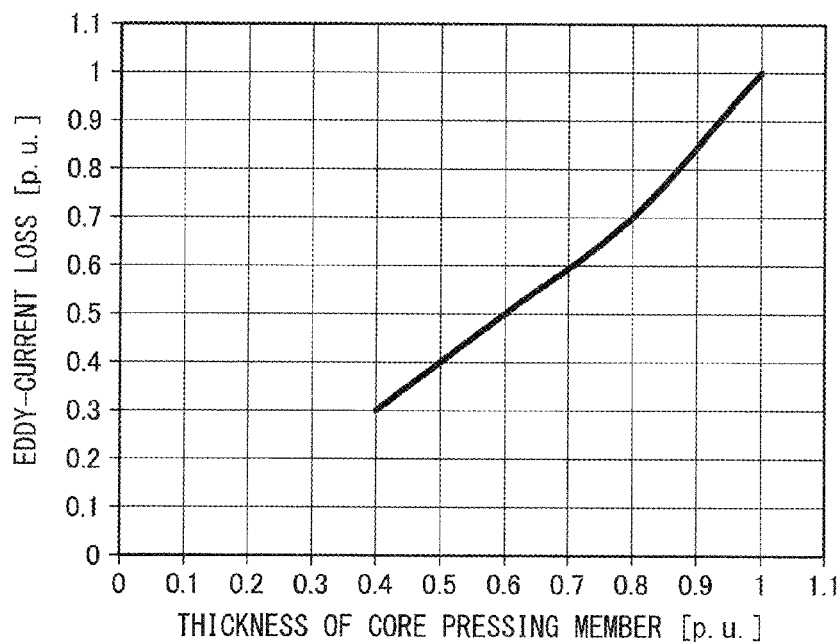
FIG. 32 is a graph showing a relationship between the thickness of the core pressing member of the example of the fourth embodiment of the invention and an eddy-current loss.

FIG. 32 is a graph showing a relationship between the thickness of the core pressing member 80 of the example of the fourth embodiment of the invention and eddy-current loss. Meanwhile, in FIG. 32, a horizontal axis represents the thickness of the core pressing member 80 as "1" when the thickness of the core pressing member 80 is equal to the heights of the first and second salient poles 12 and 13, and a vertical axis represents an eddy-current loss as "1" when the thickness of the core pressing member 80 is "1".

It is understood that an eddy-current loss is increased as the core pressing member 80 becomes thick as shown in FIG. 32. Conversely, it is understood that an eddy-current loss is reduced as the core pressing member 80 becomes thin. When the thicknesses of the portions, which are adjacent to the first and second salient poles 12 and 13 and at which magnetic flux greatly changes, of the core pressing member 80 are reduced as described above so that the thicknesses of the core pressing member 80 are set to, for example, "0.6" or less, a loss can be reduced by half or less even though double stators are driven in comparison with a case in which the thickness of the core pressing member 80 is set to "1" so that the rotor has a perfect cylindrical shape. Further, a decrease in efficiency can be reduced to less than 1%.

It is understood that a loss caused by an eddy-current loss in the core pressing member 80 having the shape shown in FIG. 31 is smaller than that in the core pressing member 80 having the shape shown in FIG. 30. The core pressing member 80 shown in FIG. 31 has a shape in which the width of the core pressing member 80 shown in FIG. 30 is reduced by half. For this reason, all the adjacent portions 84, at which magnetic flux greatly changes, of the core pressing member 80 are removed. Therefore, it is possible to reduce eddy-current loss.

According to the above description, even when the core pressing member 80 is made of a metal material such as SUS304 of JIS, eddy-current loss can be reduced by the shape of the core pressing member 80. Accordingly, even though the core pressing members 80 pressing the joints 53 of the rotor 10 having the split structure are made of a metal material, eddy-current loss is reduced. Therefore, it is possible to ensure the strength of the entire rotor 10 while preventing a decrease in efficiency.

Figure 33:
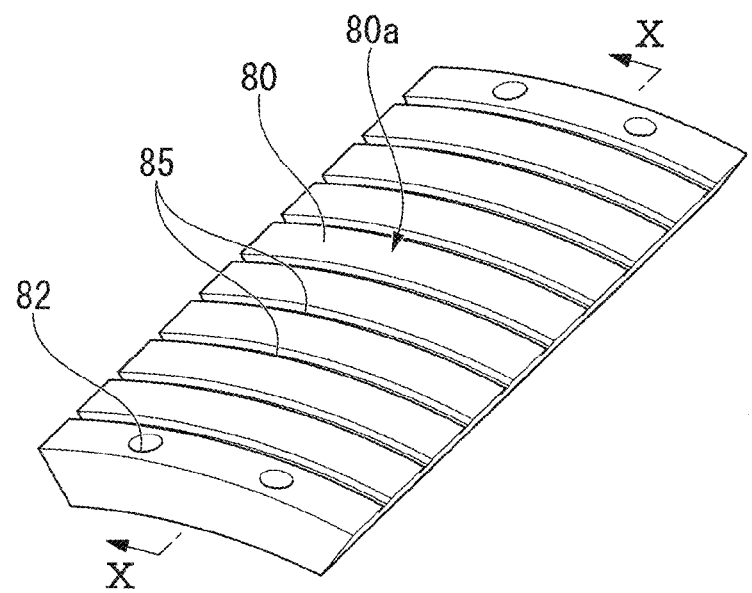
FIG. 33 is a perspective view of a core pressing member of a modification of the fourth embodiment of the invention.
Figure 34:
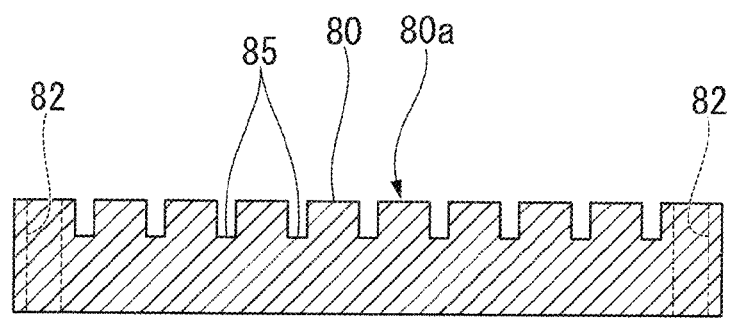
FIG. 34 is a cross-sectional view taken along line X-X of FIG. 33.
Figure 35:
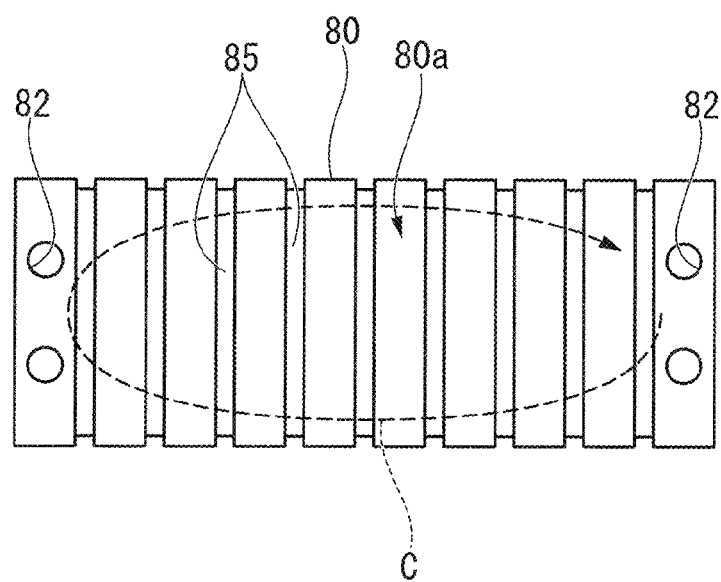
FIG. 35 is a plan view of the core pressing member of the modification of the fourth embodiment of the invention.

Further, structures shown in FIGS. 33, 34, and 35 can also be employed in the fourth embodiment.

Meanwhile, in the following description, the same components as the components of the above-mentioned embodiment or components equivalent to the components of the above-mentioned embodiment will be denoted by the same reference numerals and a description thereof will be simplified or omitted.

FIG. 33 is a perspective view of a core pressing member 80 of a modification of the fourth embodiment of the invention. FIG. 34 is a cross-sectional view taken along line X-X of FIG. 33. FIG. 35 is a plan view of the core pressing member 80 of the modification of the fourth embodiment of the invention. Meanwhile, FIGS. 33, 34, and 35 show the core pressing member 80 that is disposed between the first salient poles 12 adjacent to each other in the circumferential direction.

In this modification, as shown in FIG. 33, the core pressing member 80 includes a plurality of slits 85 that reduce eddy-current loss. The slits 85 are formed on an outer peripheral surface 80a of the core pressing member 80. The slits 85 are recessed grooves that extend in a transverse direction of the core pressing member 80 (the circumferential direction of the rotor 10). The slit 85 is formed so as to have a predetermined depth from the outer peripheral surface 80a as shown in FIG. 34. The plurality of slits 85 are formed at intervals in a longitudinal direction of the core pressing member 80 (the axial direction of the rotor 10).

According to this structure, it is possible to reduce eddy-current loss while ensuring the thickness of the core pressing member 80. That is, since the area of the outer peripheral surface 80*a* forming a current loop C is reduced when the slits 85 are formed on the outer peripheral surface 80*a* of the core pressing member 80 as shown in FIG. 35, eddy-current loss is reduced. Accordingly, in this modification, it is possible to ensure the thickness of the core pressing member 80, to increase the strength of the rotor 10, and to prevent the occurrence of windage loss during the rotation of the rotor 10.

Preferred embodiments of the invention have been described above with reference to the drawings, but the invention is not limited to the above-mentioned embodiments. The shapes, the combination, and the like of the components described in the above-mentioned embodiments are illustrative, and may be variously modified on the basis of design requirements and the like without departing from the scope of the invention.

Further, for example, an exemplary example of a three-phase motor has been used in the above-mentioned embodiments, but the invention is not limited thereto. The invention can also be applied to a two-phase motor, a four-phase motor, a five-phase motor, and the like. Furthermore, the 12/8-pole structure of the three-phase motor is an exemplary example. However, the invention is not limited to the number of the poles and may be applied to, for example, a 6/4-pole structure and the like.

Moreover, for example, an exemplary example of a structure in which the double stator switched reluctance rotating machine of the invention is applied to a motor in the above-mentioned embodiments. However, the invention is not limited thereto and can also be applied to a generator. Further, the invention can be suitably applied to, for example, a turbine generator or a wind generator as the generator.

Furthermore, for example, the structures of the first to fourth embodiments can also be appropriately combined or substituted in the invention.

INDUSTRIAL APPLICABILITY

The invention can be used in a double stator switched reluctance rotating machine.

What is claimed is:

1. A double stator switched reluctance rotating machine comprising:
an annular rotor;
an outer stator that is disposed outside the rotor; and
an inner stator that is disposed inside the rotor,
wherein the rotor is provided with a bolt fastening hole that passes through the rotor in an axial direction, and
wherein the bolt fastening hole is provided at a position depending on magnetic characteristics of the outer and inner stators,
wherein the rotor includes:
(i) an annular yoke portion,
(ii) a first salient pole that protrudes outward from the yoke portion, and
(iii) a second salient pole that protrudes inward from the yoke portion and has the same phase as the first salient pole, and
wherein the bolt fastening hole is provided at the yoke portion.

2. The double stator switched reluctance rotating machine according to claim 1,
wherein the bolt fastening hole is provided in a region that connects the first salient pole with the second salient pole in a radial direction.

3. The double stator switched reluctance rotating machine according to claim 1,
wherein the bolt fastening hole is provided on a center line that connects a center of the first salient pole with a center of the second salient pole in the radial direction.

4. The double stator switched reluctance rotating machine according to claim 2,
wherein the bolt fastening hole is provided on a center line that connects a center of the first salient pole with a center of the second salient pole in the radial direction.

5. The double stator switched reluctance rotating machine according to claim 1,
wherein a magnetomotive force of the inner stator is set to be smaller than a magnetomotive force of the outer stator, and
the bolt fastening hole is provided close to the inner stator.

6. The double stator switched reluctance rotating machine according to claim 2,
wherein a magnetomotive force of the inner stator is set to be smaller than a magnetomotive force of the outer stator, and
the bolt fastening hole is provided close to the inner stator.

7. The double stator switched reluctance rotating machine according to claim 3,
wherein a magnetomotive force of the inner stator is set to be smaller than a magnetomotive force of the outer stator, and
the bolt fastening hole is provided close to the inner stator.

8. The double stator switched reluctance rotating machine according to claim 4,
wherein a magnetomotive force of the inner stator is set to be smaller than a magnetomotive force of the outer stator, and
the bolt fastening hole is provided close to the inner stator.

9. The double stator switched reluctance rotating machine according to claim 5,
wherein the bolt fastening hole is formed at a position depending on a ratio of the magnetomotive force of the outer stator to the magnetomotive force of the inner stator in the radial direction.

10. The double stator switched reluctance rotating machine according to claim 6,
wherein the bolt fastening hole is formed at a position depending on a ratio of the magnetomotive force of the outer stator to the magnetomotive force of the inner stator in the radial direction.

11. The double stator switched reluctance rotating machine according to claim 7,
wherein the bolt fastening hole is formed at a position depending on a ratio of the magnetomotive force of the outer stator to the magnetomotive force of the inner stator in the radial direction.

12. The double stator switched reluctance rotating machine according to claim 8,
wherein the bolt fastening hole is formed at a position depending on a ratio of the magnetomotive force of the outer stator to the magnetomotive force of the inner stator in the radial direction.

13. The double stator switched reluctance rotating machine according to claim 3,
wherein a plurality of the bolt fastening holes are provided on the center line.

14. The double stator switched reluctance rotating machine according to claim 4,
   wherein a plurality of the bolt fastening holes are provided on the center line.

15. The double stator switched reluctance rotating machine according to claim 1,
   wherein the rotor is formed by a combination of a plurality of core pieces in a circumferential direction.

16. The double stator switched reluctance rotating machine according to claim 15,
   wherein the rotor includes core pressing members that are provided on at least one of the outside and inside thereof in the radial direction and press joints at which the plurality of core pieces are combined with each other.

17. The double stator switched reluctance rotating machine according to claim 1,
   wherein the bolt fastening hole has a shape depending on the magnetic characteristics of outer and inner stators.

18. The double stator switched reluctance rotating machine according to claim 1,
   wherein a width of the second salient pole is smaller than a width of the first salient pole.

19. The double stator switched reluctance rotating machine according to claim 1, further comprising a plurality of first salient poles that protrude outward from the yoke portion, each first salient pole spaced apart from each other at an interval of 45°.

* * * * *